(12) United States Patent
Bosshart

(10) Patent No.: US 7,062,635 B2
(45) Date of Patent: Jun. 13, 2006

(54) PROCESSOR SYSTEM AND METHOD PROVIDING DATA TO SELECTED SUB-UNITS IN A PROCESSOR FUNCTIONAL UNIT

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 726 days.

(21) Appl. No.: 10/224,154

(22) Filed: Aug. 20, 2002

(65) Prior Publication Data

US 2004/0039898 A1    Feb. 26, 2004

(51) Int. Cl.
*G06F 3/00* (2006.01)

(52) U.S. Cl. ...................................... 712/218
(58) Field of Classification Search ................ 712/218; 708/205, 230, 320, 507, 524
See application file for complete search history.

(56) References Cited

U.S. PATENT DOCUMENTS

| | | | | |
|---|---|---|---|---|
| 5,136,536 | A | * | 8/1992 | Ng .............................. 708/505 |
| 5,450,607 | A | * | 9/1995 | Kowalczyk et al. .......... 712/41 |
| 5,793,656 | A | * | 8/1998 | Richmond et al. .......... 708/230 |
| 5,903,479 | A | * | 5/1999 | Schwarz et al. ............. 708/205 |
| 5,957,997 | A | * | 9/1999 | Olson et al. ................. 708/205 |
| 5,991,785 | A | * | 11/1999 | Alidina et al. ............... 708/207 |
| 6,052,705 | A | * | 4/2000 | Iwase et al. ................. 708/521 |
| 6,065,112 | A | * | 5/2000 | Kishida et al. ............. 712/221 |
| 6,122,653 | A | * | 9/2000 | Kuroda ........................ 708/320 |
| 6,317,770 | B1 | * | 11/2001 | Lim et al. .................... 708/524 |
| 2002/0002573 | A1 | | 1/2002 | Landers et al. |

FOREIGN PATENT DOCUMENTS

EP    0 579 369 A1    1/1994

OTHER PUBLICATIONS

Passive Precharge and Rippled Power Logic (PPRPL) by S.B. Schaevitz et al. Dept. or Elec. Engr MIT, 3 pgs.*
David Brooks et al. "Dynamically Exploiting Narrow Width Operands to Improve Processor Power and Performance" Proceedings of $5^{th}$ International Symposium on High-Performance Computer Architecture, Jan. 9-13, 1999, pp. 13-22.

* cited by examiner

*Primary Examiner*—Eric Coleman
(74) *Attorney, Agent, or Firm*—Alan K. Stewart; W. James Brady, III; Frederick J. Telecky, Jr.

(57) ABSTRACT

A processor (50) operable in response to an instruction set comprising a plurality of instructions. The processor comprises a functional unit (52) comprising an integer number S of sub-units (54$_1$, 54$_2$, 54$_3$), wherein S is greater than one. Each of the sub-units is operable to execute, during an execution cycle, at least one of the instructions in the instruction set in response to at least two data arguments (A, B). The processor further comprises circuitry (58$_{A1}$, 58$_{A2}$, 58$_{A3}$, 58$_{B1}$, 58$_{B2}$) for providing an updated value of the at least two data arguments to less than all S of the sub-units for a single execution cycle.

22 Claims, 9 Drawing Sheets

PROCESSOR SYSTEM AND METHOD PROVIDING DATA TO SELECTED SUB-UNITS IN A PROCESSOR FUNCTIONAL UNIT

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to electronic processors such as microprocessors or digital signal processors ("DSPs"), and are more particularly directed to improving performance and efficiency through selectively forwarding data from forwarding multiplexers to no more than half of the sub-units in the processor functional unit(s).

Electronic processors including microprocessors and DSPs have become prevalent in numerous applications, including uses for devices in personal, business, and other environments. Demands of the marketplace affect many aspects of processor design, including factors such as device power consumption and speed. As a result, constant evaluation is performed by processor designers in an effort to provide improvements in these and other factors. The present embodiments also endeavor toward this end.

By way of additional background, FIG. 1 illustrates a block diagram of a prior art processor 10. For the sake of simplifying the illustration and following discussion, only certain aspects of processor 10 are shown, as providing a basis by which to appreciate the contrast between the prior art and the preferred embodiments described later. Thus, any simplification in FIG. 1 is not by way of limitation, and one skilled in the art will readily appreciate that processors typically include numerous other attributes. Turning specifically to processor 10, it includes what is referred to herein and often in the art as a functional unit 12. As also discussed later, contemporary processors may include multiple functional units in the same general configuration as the single functional unit 12 shown in FIG. 1, but the illustration of only a single such unit should suffice to provide an adequate discussion. Functional unit 12 includes what are referred to herein as sub-units $14_x$, and in the illustration these includes four sub-units $14_1$, $14_2$, $14_3$, and $14_4$. As known in the art, processor 10 has an associated instruction set, and each of sub-units $14_x$ operates to perform data operations with respect to one or more data arguments according to any one of the instructions in that instruction set. FIG. 1 illustrates various examples in this regard. First, sub-unit $14_1$ is shown as an arithmetic logic unit ("ALU"). Thus, sub-unit $14_1$ is operable, among other things, to perform an add operation corresponding to the add instruction in the instruction set. Second, FIG. 1 illustrates sub-unit $14_2$ to be a logical operator block that is operable to perform various logical operations, such as are known in the art to include by ways of example logical AND, OR, and so forth. Third, sub-unit $14_3$ is shown as a shifter unit. Thus, sub-unit $14_3$ is operable to receive as one argument an input word, and sub-unit $14_3$ shifts that data word a number of bit locations, where the number of bit shift locations is provided by another argument input to sub-unit $14_3$; additionally, in some instances a shifter is operable to perform other two-argument operations. Fourth, sub-unit $14_4$ is shown as a normalizer. Thus, sub-unit $14_4$ is operable to identify the number of leading zeroes or ones in the one word input argument received by sub-unit $14_4$.

Looking now to the connections in processor 10 and beginning in functional unit 12, it includes two forwarding multiplexers $16_A$ and $16_B$, which are named as such for reasons detailed later. For the sake of reference, let the data provided from the output of forwarding multiplexer $16_A$ be indicated as "A" and the data provided from the output of forwarding multiplexer $16_B$ be indicated as "B," as also represented by the subscript for each forwarding multiplexer. A control input is connected to forwarding multiplexer $16_A$ so that prior to an execution cycle of functional unit 12, a signal FWD_A causes multiplexer $16_A$ to select one of its inputs, which in the example of FIG. 1 consist of two inputs, and connect the data at the selected input to its output. Similarly, a control input is connected to forwarding multiplexer $16_B$ so that prior to an execution cycle of functional unit 12, a signal FWD_B at that control input causes multiplexer $16_B$ to select one of its inputs, which in the example of FIG. 1 consist of two inputs, and connect the data at the selected input to its output. The respective data outputs, A and B, of forwarding multiplexers $16_A$ and $16_B$, are connected to data input registers $18_A$ and $18_B$, respectively, where data input registers $18_A$ and $18_B$ operate according to known principles whereby an enabling clock symbol, CLK, causes the data at each such register to be stored in the register and to be presented at the register output.

The outputs of data input registers $18_A$ and $18_B$ are connected to various different ones of the sub-units $14_1$ through $14_4$, where the specific connections are typically based on the number and/or type of argument(s) required by each sub-unit. For example, with respect to sub-unit $14_1$ and as shown as an example to be an ALU, such an ALU typically requires two arguments. Thus, one of these arguments is data A provided by data input register $18_A$ and the other of these arguments is data B provided by data input register $18_B$. Similarly, each of sub-units $14_2$ and $14_3$, as shown in the respective examples as a logic operator block and a shifter, also requires two data arguments; thus, each such sub-unit is shown to receive one argument from each of data input registers $18_A$ and $18_B$. In addition and as also illustrated, sub-unit $14_3$, for the example where it is a shifter, also may receive the data A as an additional argument to indicate the number of shifts to be achieved. Lastly, sub-unit $14_4$ in the example illustrated requires only a single input argument. In processor 10, this single argument is provided to sub-unit $14_4$ from data input register $18_B$. The output of each sub-unit $14_1$ through $14_4$ is connected as an input to an output multiplexer 20; further, and for reasons discussed later, the output of output multiplexer 20 is connected as an input $A_1$ to forwarding multiplexer $16_A$ and as an input $B_1$ to forwarding multiplexer $16_B$. The output of output multiplexer 20 is connected to an input of a register 21, and the output of register 21 is connected to an input to a register file 22. Register file 22 typically has a read port for each forwarding multiplexer and, thus, in the illustrated example, register file 22 has a read port $22_2$ connected to an input $A_2$ of forwarding multiplexer $16_A$ and a read port $22_2$ connected to an input $B_2$ of forwarding multiplexer $16_B$. Lastly, processor 10 may include multiple functional units in the same general configuration as the single functional unit 12 shown in FIG. 1. In such a case of multiple functional units such as in the case of two functional units, then typically the outputs of the sub-units from a first functional unit are also connected to forwarding multiplexers in the second functional unit, and vice versa. Accordingly, while functional unit 12 is illustrated as a single functional unit and its forwarding multiplexers have two inputs (either $A_1$ and $A_2$ or $B_1$ and $B_2$), where additional functional units are included then each forwarding multiplexer may include additional inputs. In any event, the present illustration indicates only a single functional unit 12 so as to simplify the remaining discussion.

The operation of processor 10 is now described and further in view of the timing diagram of FIG. 2 and a few pseudo instruction examples. Looking first to a pseudo instruction example, consider the case that register file 22 includes at least six registers R0 through R5, and assume that the following two pseudo instructions are to be executed:

ADD R0,R1→R2                                    Instr. 1

ADD R3,R4 R5                                    Instr. 2

One skilled in the art will recognize that instruction 1 adds the contents of registers R0 and R1 and stores the result to register R2, and instruction 2 adds the contents of registers R3 and R4 and stores the result to register R5.

Looking now to the timing diagram of FIG. 2, the operation of processor 10 relative to instruction 1 is now explored in greater detail. By way of introduction, in the preferred embodiment each instruction requires multiple clock cycles to perform the instruction and preferably a new instruction commences for each clock cycle such that the time to fully complete a first instruction overlaps with one or more clock cycles of completing a second instruction that immediately-follows the first instruction; in this way, the instructions are said in the art to be pipelined and therefore FIG. 2 is sometimes referred to in the art as a pipeline timing diagram. Specifically looking to FIG. 2, it illustrates three clock cycles of operation with respect to each of instructions 1 and 2, where as shown below a portion of those operations overlap in time, thereby illustrating the pipelining as introduced above. For reasons explored later, FIG. 2 also indicates the relative timing of two additional instructions 3 and 4, which generally follow the same timing as instructions 1 and 2, but which provide for different observations made later. Looking first to the case of instructions 1 and 2, at time $t_0$, instruction 1 reads its arguments R0 and R1; particularly, the FWD_A signal is set such that forwarding multiplexer $16_A$ reads one of these arguments as data A from read port $22_1$ of register file 22, and at the same time the FWD_B is set such that forwarding multiplexer $16_B$ reads the other of these arguments as data B from read port $22_2$ of register file 22. By the end of the read cycle, that is, by time $t_1$, these two arguments are clocked into data input registers $18_A$ and $18_B$, respectively. Continuing with instruction 1, from time $t_1$ to time $t_2$, sub-unit $14_1$ executes the intended instruction 1, which is an ADD. Thus, by the completion of the instruction 1 execute cycle at time $t_2$, the sum produced by the ADD is available at the output of sub-unit $14_1$, selected by output multiplexer 20, and also is latched into register 21. Finally, during the write cycle of instruction 1 as completed by time $t_3$, the value in register 21 (i.e., the sum from the ADD instruction) is stored into register R2 of register file 22.

The operation of processor 10 relative to instruction 2 is now explored in greater detail and, as introduced above, is shown to overlap in part the operation relative to instruction 1. At time $t_1$, instruction 2 reads its arguments R3 and R4, where like instruction 1 this is achieved by setting FWD_A and FWD_B so that forwarding multiplexers $16_A$ and $16_B$ read respective arguments data A and data B from read ports $22_1$ and $22_2$ of register file 22, and those arguments are clocked into data input registers $18_A$ and $18_B$, respectively. Note also that this read cycle coincides with the execute cycle of instruction 1, that is, the access of data for instruction 2 is occurring at the same time as is the processing (e.g., adding) of data for instruction 1. Next, from time $t_2$ to time $t_3$, sub-unit $14_1$ executes the intended instruction 2 which again is an ADD; here, however, the add is with respect to the instruction 2 arguments from registers R3 and R4. Thus, by the completion of the instruction 2 execute cycle at time $t_3$, the sum produced by the ADD is available at the output of sub-unit $14_1$, selected by output multiplexer 20, and latched into register 21. Finally, during the write cycle of instruction 2 as completed by time $t_4$, the sum from register 21 is stored into register R5 of register file 22.

Additional operation of processor 10 is now described, with an example that presents the basis for the reference of multiplexers $16_A$ and $16_B$ as "forwarding" multiplexers. Particularly, consider now an example where the following two pseudo instructions are to be executed:

ADD $R_0$,R1→R2                                 Instr. 3

ADD R2,R4→R5                                    Instr. 4

Instruction 3 is the same as instruction 1 and, hence, the reader is assumed familiar with the level of detail described above. Instruction 4, however, adds the contents of registers R2 and R4 and stores the result to register R5, where note therefore that the argument R2 in instruction 4 requires the result of the immediately-preceding instruction 3. This requirement is sometimes referred to as a hazard, for reasons further detailed below.

Looking again to the timing diagram of FIG. 2 and now with respect to instructions 3 and 4, instruction 3 proceeds in the same manner as described above with respect to instruction 1. Looking then to instruction 4, between time $t_1$ and time $t_2$ it requires its arguments, which are to be from registers R2 and R4. However, note that as of time $t_2$, instruction 3 has not yet written its result into register file 22. Thus, from register file 22, this result, as the needed argument for instruction 4, is not available. As a result, this contingency is sometimes referred to as a hazard because, without additional consideration taken, there is the potential hazard of reading the non-updated value to be written out of register R2. Given this possibility, recall that the output of each sub-unit $14_x$ is not only connected as an input to multiplexer 20, but it is also returned as an input to each forwarding multiplexer $16_x$. With this added connection and continuing with FIG. 2 and instruction 4, from time $t_1$ to time $t_2$, forwarding multiplexer $16_A$ "forwards" the output of sub-unit $14_1$ directly back to data input register $18_A$, from where instruction 4 reads the argument; thus, the result of instruction 3, which is to be written to register R2 from time $t_2$ to time $t_3$, is before time $t_2$ forwarded and read by instruction 4. It is for this reason that multiplexer $16_A$ is termed a forwarding multiplexer, and this reasoning applies likewise to the similar connectivity and operability of forwarding multiplexer 16B. Lastly, completing the operation of processor 10 with respect to instruction 4, from time $t_3$ to time $t_4$, the result of instruction 4 is written, via multiplexer 20, into register R5 of register file 22.

While the preceding structure and method of operation for processor 10 has provided useful and beneficial in many devices and applications, the present inventors has recognized that it has various limitations and drawbacks. More particularly, as stated earlier, factors such as device power consumption and speed are critical in contemporary processor design. Toward this end, the present inventor has recognized that these parameters in connection with processor 10 may be improved upon, as is provided by the preferred embodiments described below.

BRIEF SUMMARY OF THE INVENTION

In the preferred embodiment, there is a processor operable in response to an instruction set comprising a plurality of instructions. The processor comprises a functional unit comprising an integer number S of sub-units, wherein S is greater than one. Each of the sub-units is operable to execute, during an execution cycle, at least one of the instructions in the instruction set in response to at least two data arguments. The processor further comprises circuitry for providing an updated value of the at least two data arguments to less than all S of the sub-units for a single execution cycle.

Other circuits, systems, and methods are also disclosed and claimed.

DETAILED DESCRIPTION OF THE INVENTION

Figure 1:
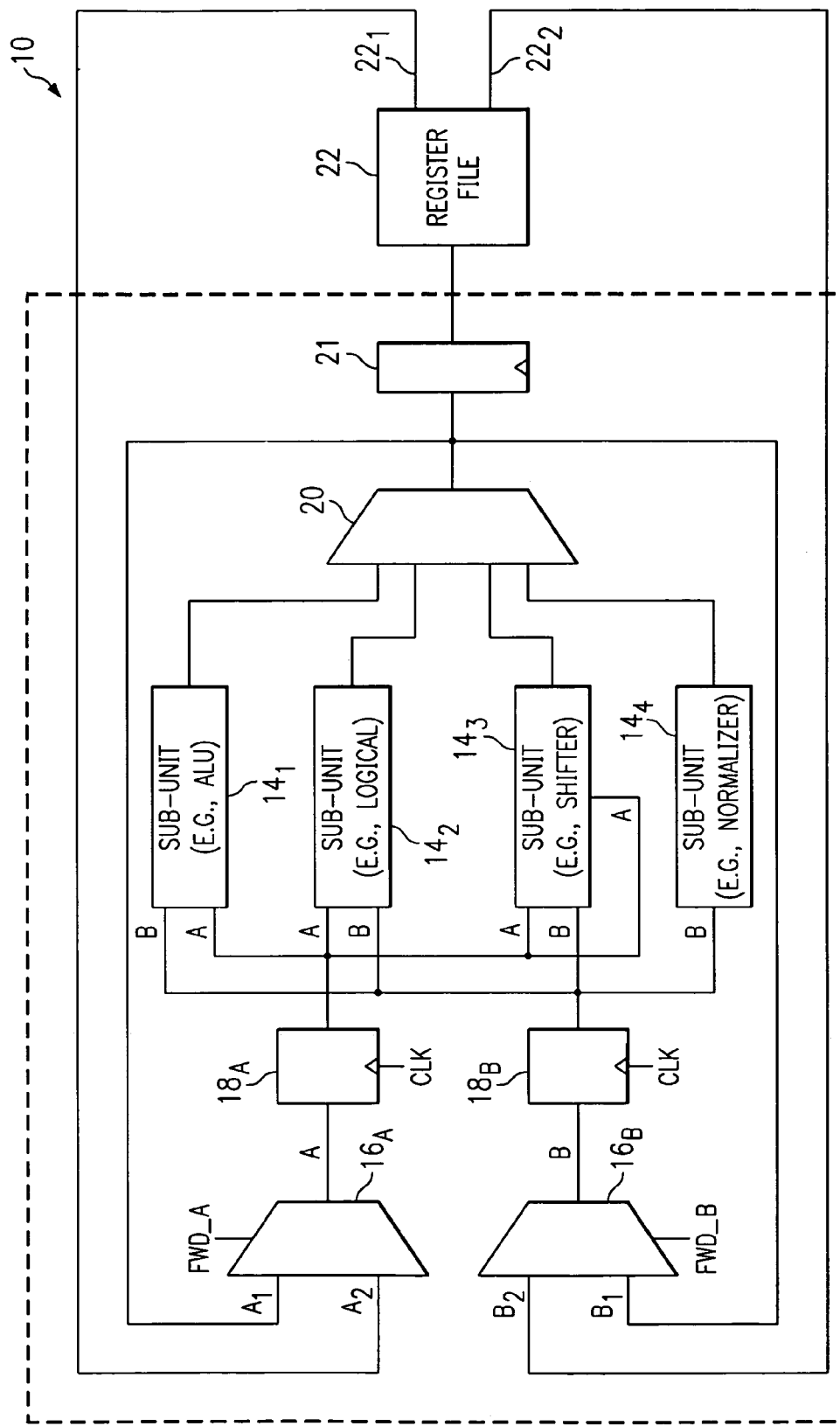
FIG. 1 illustrates a block diagram of a prior art processor 10.
Figure 2:
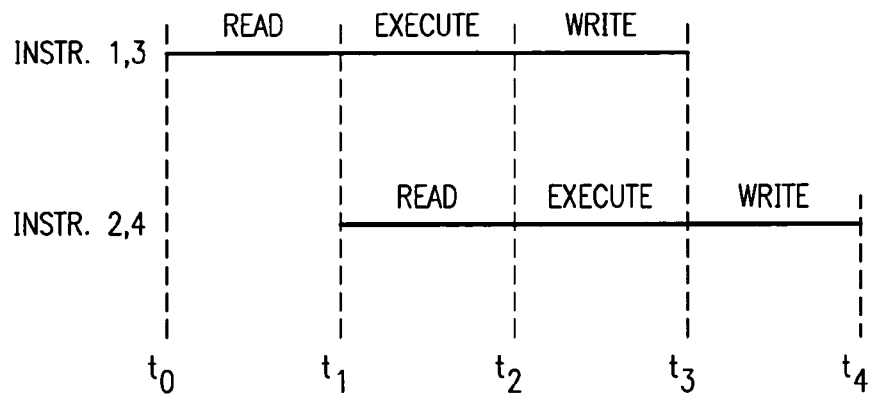
FIG. 2 illustrates three clock cycles of operation of the processor of FIG. 1 with respect to each of four instructions 1, 2, 3, and 4.

FIGS. 1 and 2 were described earlier in the Background Of The Invention section of this document and the reader is assumed to be familiar with the principles described above relative to those Figures.

Figure 3:
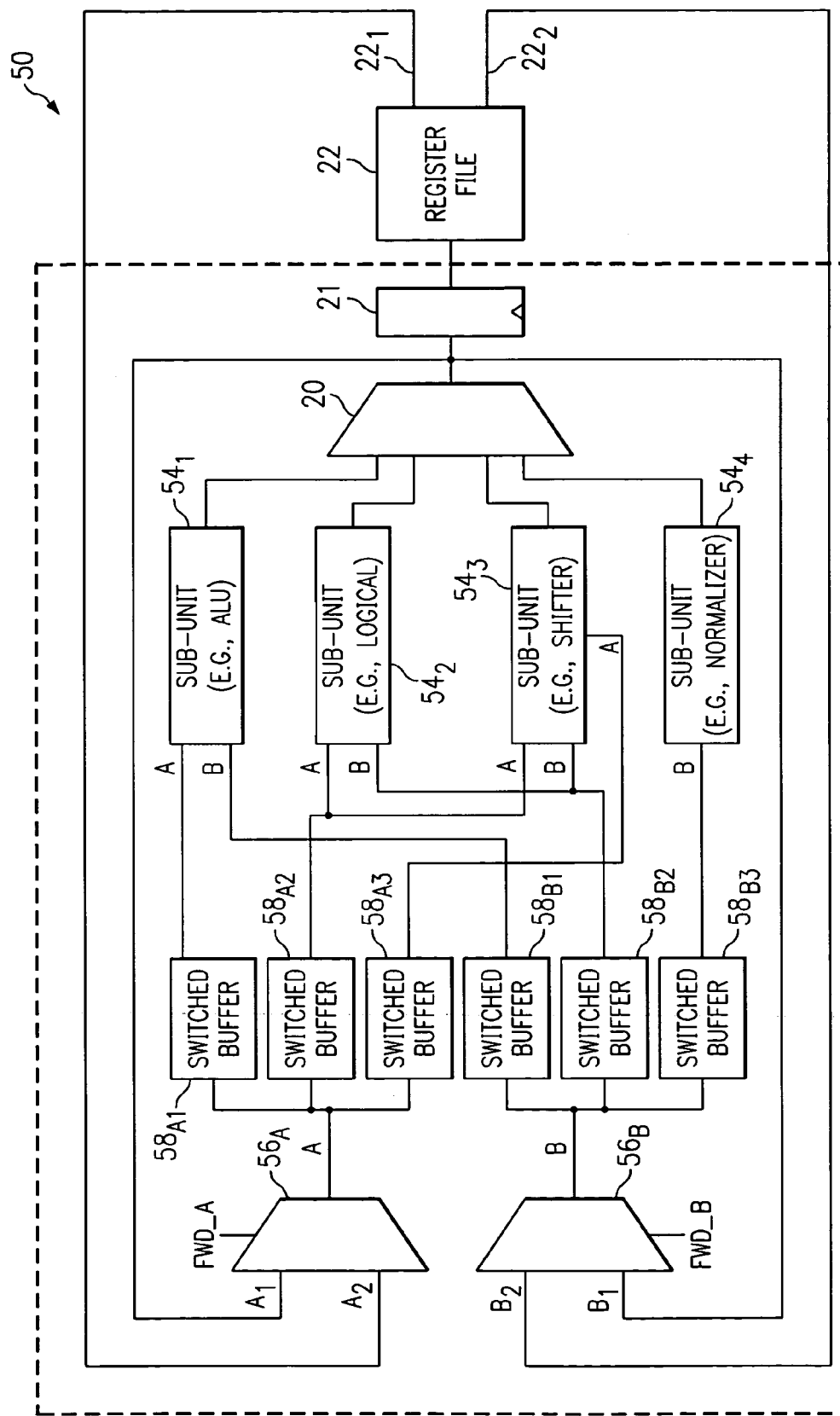
FIG. 3 illustrates a block diagram of a processor according to one preferred embodiment.

FIG. 3 illustrates a block diagram of a processor 50 according to one preferred embodiment, where the preferred embodiment by way of example may be implemented in the TMS320C6400 family of DSPs provided by Texas Instruments Incorporated. Processor 50 includes certain of the same blocks as used in processor 10 of FIG. 1 and, thus, to the extent such commonality is used, like reference numbers are carried forward from FIG. 1 to FIG. 3. However, additional items are re-numbered due to a change in either or both of their structure and functionality and, indeed, given these changes, processor 50 as a whole is improved over prior art processor 10. These various changes as well as the benefits provided by them are addressed below. Lastly, again for simplification of the discussion and also for sake of comparison to the earlier discussion of the prior art, only certain aspects of processor 50 are shown and any simplification in FIG. 3 is not by way of limitation, where one skilled in the art will readily appreciate that processor 50 will include numerous other attributes.

Turning specifically to processor 50, it includes a functional unit 52, which includes four sub-units $54_1$, $54_2$, $54_3$, and $54_4$. As described with respect to processor 10, these sub-units $54_1$, $54_2$, $54_3$, and $54_4$ are by way of example shown respectively as an ALU, a logical operator block, a shifter, and a normalizer. As detailed later, however, circuitry within these sub-units may differ from the prior art because certain functionality is achieved in advance of these devices, thereby permitting a less complex structure to be required in each sub-unit. Moreover, as mentioned earlier, contemporary processors and processor 50 may include multiple functional units in the same general configuration as the single functional unit 52 shown in FIG. 3. In such a case of multiple functional units such as in the case of two functional units, then typically the outputs of the sub-units from a first functional unit are also connected to forwarding multiplexers in the second functional unit, and vice versa. Accordingly, while functional unit 52 is illustrated as a single functional unit and its forwarding multiplexers have two inputs (either $A_1$ and $A_2$ or $B_1$ and $B_2$), where additional functional units are included then each forwarding multiplexer may include additional inputs. In any event, the present illustration indicates only a single functional unit 52 so as to simplify the remaining discussion, but the present inventive scope contemplates both singular and multiple functional units connected consistent with the teachings of this document. In any event, therefore, each sub-unit $54_x$ is by way of example and illustration, where the present inventive scope is not intended to be limited thereto. Rather, included within functional unit 52 and the inventive scope is any sub-unit, operable to receive one or more data arguments, and to process each such argument(s) to perform one or more of the instructions of the instruction set for processor 50.

Looking now to the connections in functional unit 52, it includes two forwarding multiplexers $56_A$ and $56_B$, which are named as such for the same reasons discussed above relative to processor 10; however, as detailed later, in the preferred embodiments the circuitry of forwarding multiplexers $56_A$ and $56_B$ may differ from the prior art in various respects. For the sake of consistent reference with the earlier discussion, the data provided from the output of forwarding multiplexer $56_A$ is indicated as "A" and the data provided from the output of forwarding multiplexer $56_B$ is indicated as "B," and each forwarding multiplexer receives a control input so that in a given cycle a respective signal FWD_A and FWD_B causes the corresponding multiplexer to select one of its inputs and connect the data at the selected input to its output.

Each of the respective data outputs, A and B, of forwarding multiplexers $56_A$ and $56_B$, is connected to a set of three switched buffers. Specifically, data output A of forwarding multiplexer $56_A$ is connected as an input to: (1) switched buffer $58_{A1}$, which has its output connected as an input to sub-unit $54_1$; (2) switched buffer $58_{A2}$, which has its output connected as an input to sub-unit $54_2$ and to sub-unit $54_3$; and (3) switched buffer $58_{A3}$, which has its output connected as an input to sub-unit $54_3$—note that for the present example where sub-unit $54_3$ is a shifter, the data to it from switched buffer $58_{A3}$ is shown connected to the bottom of the illustrated block to depict that the provided data indicates the extent of the shift to be performed by the shifter. Further, data output B of forwarding multiplexer $56_B$ is connected as an input to: (1) switched buffer $58_{B1}$, which has its output connected as an input to sub-unit $54_1$; (2) switched buffer $58_{B2}$, which has its output connected as an input to sub-unit $54_2$ and to sub-unit $54_3$; and (3) switched buffer $58_{B3}$, which has its output connected as an input to sub-unit $54_4$. As detailed below, each switched buffer is constructed and functions as its name suggests, that is, to buffer (i.e., provide) data to an output only once switched on (i.e., enabled). The output of each sub-unit $54_x$ is connected as an input to output multiplexer 20, and, for reasons comparable to those discussed above with respect to processor 10, the output of output multiplexer 20 is also connected as an input to each of forwarding multiplexers $56_A$ and $56_B$. Output multiplexer 20, register 21, and register file 22 have connections as also described earlier with respect to processor 10.

The operation of processor 50 is now described. In some respects, the operation of processor 50 is comparable to that described above with respect to FIG. 2 and processor 10, such as the operability of executing different instructions in successive clock cycles and with the ability to forward data from the output of any sub-unit $54_x$ to avoid hazards. However, the preferred embodiment provides additional performance through the inclusion of the switched buffers $58_{A1}$ through $58_{B3}$, as is explored in the remainder of this document. In the preferred embodiment, for a given instruction that will be executed by one of the sub-units $54_x$, then only the switched buffer(s) providing data to the input of that sub-unit are enabled, thereby providing the updated argument(s) only to that sub-unit. For example, assume in a first instance that an add instruction is to be executed by sub-unit $54_1$, as an ALU in the example. Further, sub-unit $54_1$ is connected to receive its input arguments from switched buffers $58_{A1}$ and $58_{B1}$. As a result, during the read of these arguments into sub-unit $54_1$, only switched buffers $58_{A1}$ and $58_{B1}$ are enabled, thereby providing the updated A and B arguments only to sub-unit $54_1$. Note therefore that during this example, the remaining switched buffers are not enabled with respect to the updated data and, thus, the updated data A and B is not provided to any of the other sub-units. Given the two data arguments, sub-unit $54_1$ performs the add operation. Thereafter, the result is output and written as described above. Lastly and as detailed later, in certain instances the preferred embodiments may provide arguments to more than one sub-unit, but in all respects the preferred embodiments endeavor to provide these arguments to less than all of the sub-units that otherwise require these arguments for other instructions, and preferably to no more than one-half of the sub-units in a functional unit.

Before proceeding with other examples of operation of processor 50, note that the function of connectivity by switched buffers $58_{A1}$, and $58_{B1}$ is highly advantageous over the prior art. Specifically, by now contrasting this result with processor 10, it is seen that the prior art processor 10 provides the data A to three sub-units during every execution cycle and it also provides the data B to all four sub-units during every execution cycle. More particularly, for each sub-unit $14_x$ that requires a given data argument A or B, the prior art processor 10 provides that argument to all such sub-units for every execute cycle. In other words, for certain but not all execute cycles, any of sub-units $14_1$, $14_2$, and $14_3$ require the data argument A; however, due to the connectivity and operability of processor 10, then in each instance when the data argument A is presented for any execute cycle, all of those same sub-units $14_1$, $14_2$, and $14_3$ receive that data A argument. Similarly, for certain but not all execute cycles, any of sub-units $14_1$, $14_2$, $14_3$, and $14_4$ require the data argument B; however, due to the connectivity and operability of processor 10, then in each instance when the data argument B is presented for any execute cycle, all of those same sub-units $14_1$, $14_2$, $14_3$, and $14_4$ receive that data B argument. The present inventor has recognized that such an approach is inefficient for various reasons. For example, the prior art's additional connectivity of each data argument to all sub-units causes each of those sub-units to dissipate power in connection with receiving the data argument. Thus, when data is updated and presented to the sub-units, while one of the sub-units actually requires the data argument to perform the needed execution, the other sub-units still receive the updated data and thus those sub-units also dissipate power in connection with having received the argument. Consequently, a considerable amount of wasteful power dissipation occurs with respect to those other sub-units. As another example, forwarding multiplexers $16_A$ and $16_B$ must provide sufficient drive power to provide the data A and B arguments. Due to the observations above relating to the prior art provision of the updated arguments to all sub-units that correspond to those arguments, then there is considerable capacitive load on the drive circuitry of forwarding multiplexers $16_A$ and $16_B$, and possibly circuitry preceding those devices; thus, the forwarding multiplexers $16_A$ and $16_B$ and possible related circuitry must be sized in a manner sufficient to drive this load. Further, these larger devices present a larger capacitive load to what is driving them as compared to smaller devices and, thus, they can decrease device speed of processor 10 including its critical path speed. Looking now in contrast to the preferred embodiment of processor 50, these prior art drawbacks are considerably reduced. For example, in the case of the add operation, the data A and B arguments are provided only to a single sub-unit $54_1$. Thus, while there are a total of three sub-units $54_1$, $54_2$, and $54_3$ that in certain clock cycles will require the data A argument, only one of those sub-units $54_1$ receives the updated value of that data A argument for the ADD instruction. Consequently, the other sub-units $54_2$ and $54_3$ are not forced to dissipate power in connection with the updated value of the data A argument. Additionally, because only the sub-unit $54_1$ is driven with the updated data A argument during that execute cycle, then the driving circuitry of forwarding multiplexer $56_A$, and possibly circuitry preceding it, can be smaller and, hence, faster, than that of the prior art. Similar observations may be made by one skilled in the art with respect to the data B argument in the preferred embodiment, as will be still further appreciated from the remaining discussion in this document.

From the preceding, one skilled in the art may appreciate other examples of operation of processor 50 and the accompanying selective connectivity of data arguments to no more than half of the sub-units $54_x$ in functional unit 52. Consider then an instance that a logical AND instruction is to be executed by sub-unit $54_2$, as a logical operator block in the example. In this case, sub-unit $54_2$ is connected to receive its A and B input arguments from switched buffers $58_{A2}$ and $58_{B2}$, respectively. As a result, during the read of these arguments into sub-unit $54_2$, only switched buffers $58_{A2}$ and $58_{B2}$ are enabled, thereby providing these updated arguments to sub-unit $54_2$. Again, the remaining switched buffers are not enabled and, thus, the updated values of data A and B are not provided to the sub-units connected to these other switched buffers. Given the two data arguments, sub-unit $54_2$ performs the logical operation, and thereafter the result is output and written as described above. Further in this example, note also that switched buffer $58_{B2}$ has its output also connected to provide a data B shift argument to sub-unit $54_3$. Thus, in this example, while the updated data B is provided to sub-unit $54_2$, it is also provided to sub-unit $54_3$. This example illustrates that there are instances, as may be ascertained by one skilled in the art, where a benefit may be achieved in still permitting more than one sub-unit to receive a data argument in a given clock cycle, but preferably half of less than half of the sub-units receives the data argument. Note that such an instance does provide a greater capacitive load on the data argument as compared to only providing the data to a single sub-unit, but there is a trade-off benefit in that there can be, for a given data A or B, a lesser number of switched buffers than sub-units. In other words, in order to provide each data argument to only one sub-unit in each case, then the number of switched buffers per forwarding multiplexer output must equal the number of subunits in a functional unit. The compromise in the present example permits a lesser number of such switched buffers to be used as compared to the number of sub-units. Considering this further, for a processor with a number N of sub-units requiring a given data argument at one clock cycle or another to execute a corresponding instruction, the prior art drives all of these N sub-units with the output of a forwarding multiplexer (e.g., processor 10 has N=3 sub-units $14_1$, $14_2$, and $14_3$ requiring the A data argument and it drives all of those sub-units each time A is updated; processor 10 has N=4 sub-units $14_1$, $14_2$, $14_3$, and $14_4$ requiring the B data argument and it drives all of those sub-units each time B is updated). In contrast, the preferred embodiment uses N or less switched buffers per forwarding multiplexer output and for a given execution cycle it drives only a single sub-unit with the output of a forwarding multiplexer or it alternatively may preferably drive half or less than half of the N sub-units, in an effort to reduce the load on the data driving circuitry and to reduce dissipation of power in the functional unit as a whole. Lastly, and as also detailed later, in one embodiment, processor 50 may be constructed using dynamic logic. As such, one skilled in the art may readily ascertain manners to disable selected ones of the sub-units $54_x$ during a given read cycle. Accordingly, with such a capability, where the preferred embodiment provides a data argument both to a target sub-unit that is to execute according to that argument as well as to an additional sub-unit(s), then at the same time the target sub-unit is reading the argument the additional sub-unit(s) can be disabled during the read cycle, which thereby provides minimal, if any, load from the additional sub-unit(s) on the data being provided by the data driving circuitry.

The remaining two illustrated examples of sub-unit operation of processor 50 involve its sub-units $54_3$ and $54_4$. For sub-unit $54_3$, assume in another execute cycle that a shift is to be executed by sub-unit $54_3$. Sub-unit $54_3$ is connected to receive the data A input argument from either switched buffer $58_{A2}$ and $58_{A3}$ and the data B argument from switched buffer $58_{B2}$. As a result, depending on the type of shift operation to be achieved, the appropriate arguments are provided to sub-unit $54_3$ by enabling only selected ones of these switched buffers. If, therefore, the data A input argument is to come from switched buffer $58_{A3}$, then that data A argument is not, for that execution cycle, connected to any of the other sub-units $54_1$, $54_2$, or $54_4$. Further, switched buffer $58_{B2}$ is enabled to provide the data B argument to shift unit $54_3$, and at the same time that data B argument is therefore provided to sub-unit $54_2$. Thus, for this instance, for a total of four subunits $54_x$, only one of them is driven with the data A argument and only half of them are driven with the data B argument.

For sub-unit $54_4$, assume in another instance that a normalization is to be executed by sub-unit $54_4$. Recall that a normalizer operates with respect to a single argument. Further, in the preferred embodiment, switched buffer $58_{B3}$ is connected to provide its data B output only to the input of sub-unit $54_4$. As a result, during the read of the single argument into sub-unit $54_4$, only switched buffer $58_{B3}$ is enabled, thereby providing the single arguments to sub-unit $54_4$. Accordingly, during this example, the remaining switched buffers are not enabled and, thus, the data A and B are not provided to any of the other sub-units. Thereafter, the result is output and written as described above.

Figure 4:
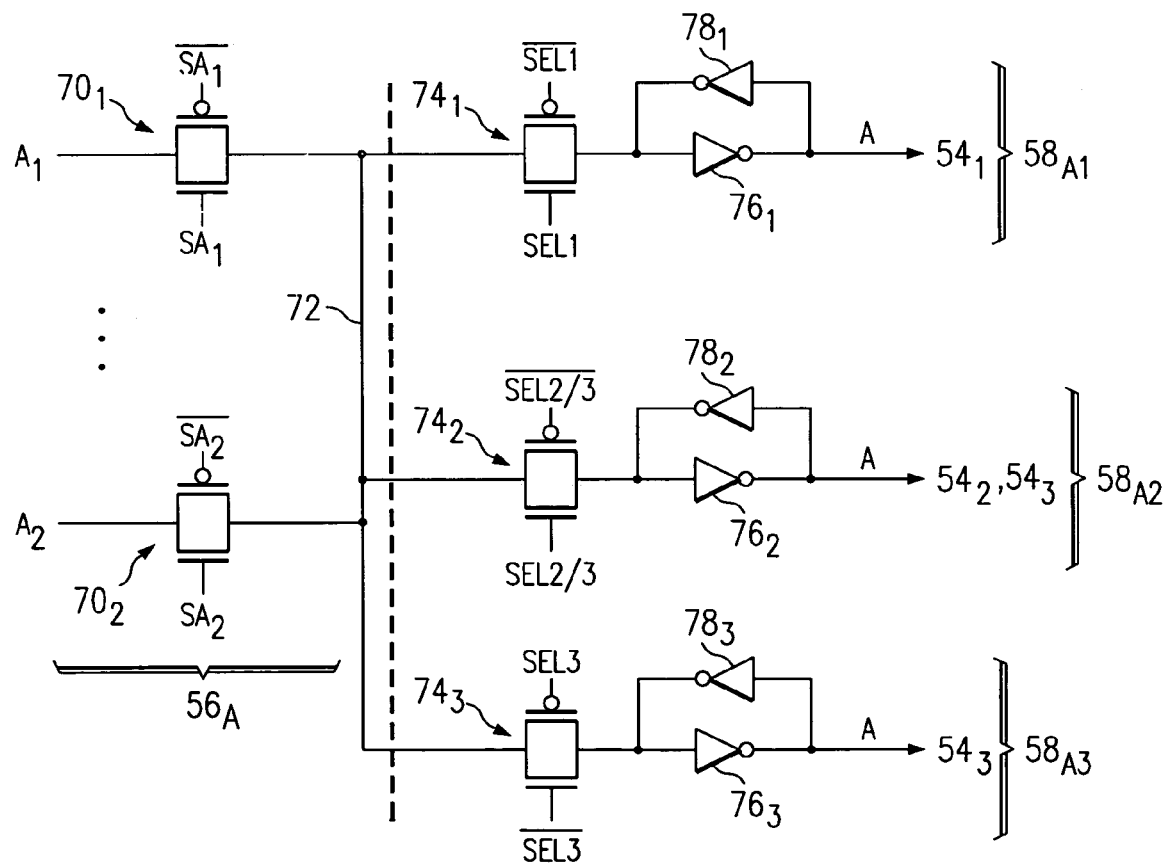
FIG. 4 illustrates a schematic of a preferred embodiment implementation of forwarding multiplexer $56_A$ and switched buffers $58_{A1}$, $58_{A2}$, and $58_{A3}$ from FIG. 3.

FIG. 4 illustrates a schematic of a preferred embodiment implementation of forwarding multiplexer $56_A$ and switched buffers $58_{A1}$, $58_{A2}$, and $58_{A3}$ from FIG. 3 using static circuitry. Further, one skilled in the art may comparably apply the illustration and following discussion to forwarding multiplexer $56_B$ and switched buffers $58_{B1}$, $58_{B2}$, and $58_{B3}$ from FIG. 3, but for sake of simplifying the discussion, the FIG. 4 illustration is not duplicated with respect to the comparable forwarding multiplexer $56_B$ and switched buffers $58_{B1}$, $58_{B2}$, and $58_{B3}$. Further, while FIG. 4 and later Figures illustrate the connection of data of a single bit for both forwarding multiplexers and switched buffers, it, should be appreciated that sub-units $54_1$, $54_2$, $54_3$ and $54_4$ typically operate on some multiple-bit ("word") basis and, thus, the single bit illustrations are to simplify the overall illustration with it understood that one skilled in the art may replicate the illustrated circuitry as so to accommodate multiple bit transfer to the processor sub-units.

Turning to multiplexer $56_A$ in FIG. 4, input $A_1$ is connected to a CMOS pass gate $70_1$, which is formed by connecting the respective source/drain paths of a p-channel and n-channel transistor in parallel as known in the art. The gates of the p-channel and n-channel transistors are connected to receive respective complementary signals $\overline{SA_1}$ and $SA_1$. Input $A_2$ is connected to a CMOS pass gate $70_2$, also formed with parallel source/drain connected p-channel and n-channel transistors, and the gates of these p-channel and n-channel transistors are connected to receive respective complementary signals $\overline{SA_2}$ and $SA_2$. The outputs of each of pass gates $70_1$ and $70_2$ is connected to a node 72.

Node 72 is connected as an input to each of switched buffers $58_{A1}$, $58_{A2}$, and $58_{A3}$. Looking first to switched buffer $58_{A1}$, node 72 is connected to the input of a CMOS pass gate $74_1$, formed with parallel source/drain connected p-channel and n-channel transistors, and the gates of these p-channel and n-channel transistors are connected to receive respective complementary signals $\overline{SEL1}$ and SEL1. The output of pass gate $74_1$ is connected to the input of an inverter $76_1$, which has its output connected to the input of an inverter $78_1$, and the output of inverter $78_1$ is connected to the input of inverter $76_1$. Thus, inverters $76_1$ and $78_1$ form a latch, as known in the art. Further, in the preferred an additional pass gate is connected between the output of the feedback inverter (e.g., inverter $78_1$) and the input of the non-feedback inverter (e.g., inverter $76_1$), although such a pass gate is not expressly illustrated in order to simplify the Figure; instead, it should be understood to be included as now described, and indeed such a pass gate device should be understood to be included in all remaining latches described herein as using the combination of a feedback (e.g., $78_1$) and non-feedback inverter (e.g., $76_1$). The additional pass gate is controlled by a control signal such that this additional pass gate is disabled during the time that data is presented to the input of the non-feedback inverter, and such that the additional pass gate is enabled once the data has been presented to the input of the non-feedback manner. The additional pass gate is preferred because, without it, the input to the latch is required to drive a signal sufficient to overcome the output of the feedback inverter in the latch, whereas with the additional pass gate, which is disabled at the time the data drives the latch and thereby removes the effect of the output of the feedback inverter (e.g., inverter $78_1$), the drive to the latch input does not have to overcome the effect of the feedback inverter output. The output of inverter $76_1$ (i.e., of the latch) is connected to provide the data A to sub-unit $54_1$. Similarly, node 72 is connected to the input of a CMOS pass gate $74_2$, formed with parallel source/drain connected p-channel and n-channel transistors, and the gates of these p-channel and n-channel transistors are connected to receive respective complementary signals $\overline{SEL2/3}$ and SEL2/3. The output of pass gate $74_2$ is connected to the input of an inverter $76_2$, which has its output connected to the input of an inverter $78_2$, and the output of inverter $78_2$ is connected to the input of inverter $76_2$, thereby forming another latch (again using a pass gate, not shown, between the output of the feedback inverter $78_2$ and the input of the non-feedback inverter $76_2$). The output of inverter $76_2$ is connected to provide the data A to sub-units $54_2$ and $54_3$. Finally, node 72 is connected to the input of a CMOS pass gate $74_3$, formed with parallel source/drain connected p-channel and n-channel transistors, and the gates of these p-channel and n-channel transistors are connected to receive respective complementary signals $\overline{SEL3}$ and SEL3. The output of pass gate $74_3$ is connected to the input of an inverter $76_3$, which has its output connected to the input of an inverter $78_3$, and the output of inverter $78_3$ is connected to the input of inverter $76_3$, thereby forming another latch. The output of inverter $76_3$ is connected to provide the data A to sub-unit $54_3$.

Figure 5:
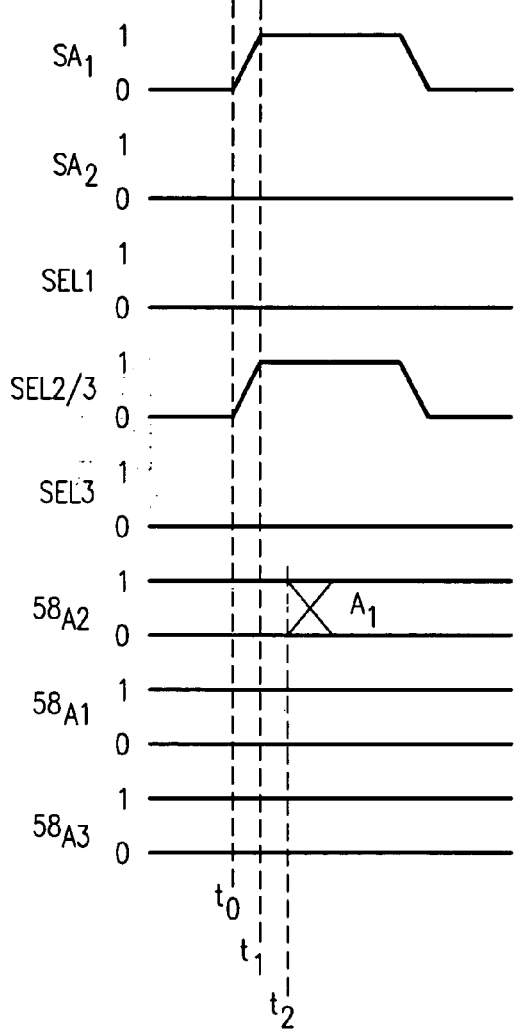
FIG. 5 illustrates a timing diagram of the example where forwarding multiplexer $56_A$ selects the $A_1$ data input and switched buffer $58_{A2}$ provides the data on that input to sub-units $54_2$ and $54_3$.

The operation of forwarding multiplexer $56_A$ and switched buffers $58_{A1}$, $58_{A2}$, and $58_{A3}$ from FIG. 4 is now described through an example and further in view of the timing diagram of FIG. 5. By way of introduction, FIG. 5 illustrates the example where forwarding multiplexer $56_A$ selects the $A_1$ data input and switched buffer $58_{A2}$ provides the updated data on that input to sub-units $54_2$ and $54_3$. At time $t_0$, a rising transition is generated for the pass gate control signals of the forwarding multiplexer pass gate connected to the data that is to be selected for output to a desired sub-unit(s). In the present example, therefore, the rising transition occurs for $SA_1$ and is shown to complete by time $t_1$. Thus, this rising transition is applied to the gate of the n-channel transistor of pass gate $70_1$, while the complement of the rising transition (i.e., a falling transition) is applied to the p-channel transistor of pass gate $70_1$. Consequently, the updated data at input $A_1$ passes through pass gate $70_1$ to node 72. Also at time $t_0$ (or following time to), a rising transition is generated for the pass gate control signals of only the one switched buffer pass gate connected to the sub-unit that is to execute in response to the data being read. In the present example, therefore, the rising transition occurs for SEL2/3 and is also shown to complete by time $t_1$, while no such transition occurs for SEL1 or SEL3. Thus, this rising transition is applied to the gate of the n-channel transistor of pass gate $74_2$, while the complement of the rising transition (i.e., a falling transition) is applied to the p-channel transistor of pass gate $74_2$. Consequently, the updated data at input $A_1$ passes from node 72 and is inverted by inverter $76_2$ and output to subunits $54_2$ and $54_3$, as shown by the possible signal transition at $t_2$. Note also and by way of contrast that at time $t_2$ the outputs of switched buffers $58_{A1}$ and $58_{A3}$ do not transition, that is, any previous data state of those outputs remains unchanged and, thus, those outputs at that time do not provide updated data (i.e., there is no signal transition in those signals). Further, note that the updated data state that is provided at $t_2$ by switched buffer $58_{A2}$ is maintained (until later changed by pass gates forwarding new data) by inverter $78_2$. Given the preceding, one skilled in the art may readily apply this operation to determine how the illustrated circuitry also selects data from either of inputs $A_1$ or $A_2$ (or additional inputs, if any) and operates to output the selected data to any of: (i) the outputs connected to sub-unit $54_1$; (ii) the mutual connection to sub-unit $54_2$ and $54_3$; or (iii) the single output to sub-unit $54_3$. In each instance, a forwarding multiplexer pass gate connected to a data input is enabled to sample the data, or all such pass gates may be disabled if the unit is unused. Further, when one of the forwarding multiplexer pass gates is enabled, exactly one of the switched buffer pass gates is also enabled, thereby outputting the data to the desired sub-unit(s). In addition, note that inverters $78_1$, $78_2$, and $78_3$, as feedback devices, are preferably relatively small devices sufficient in size to hold the voltage levels on their inputs when the pass gates are disabled. Indeed, given these feedback devices, note therefore that the previous data state given to each inverter pair is maintained until a new updated data input is provided. Accordingly, while an inverter pair may provide previous (i.e., non-updated) data to a sub-unit that is not to execute during a given cycle, there is no signal transition to that sub-unit at that time; as a result, since the sub-unit does not receive a signal transition at that time, then there is the benefit that there is also no active power dissipation, which otherwise would have occurred had the signal transition been connected to the sub-unit. In addition, because the preferred embodiment provides the updated data to only one of inverters $76_1$, $76_2$, $76_3$ as the three non-feedback inverter of the latch inverter pairs, then the transmission gates and other driving circuitry preceding those pairs is preferably sized only to drive that one inverter at a time; in contrast, recalling that the prior art provides updated data to all sub-units that are operable at any time to execute with respect to that argument, the prior art therefore requires considerably larger driving circuitry and, hence, is therefore slower in this data path as compared to the preferred embodiments. Finally, while FIGS. 4 and 5 illustrate forwarding multiplexer $56_A$, the same principles are readily applied by one skilled in the art to forwarding multiplexer 56$_B$, with appropriate changes to route the signals shown connected to those devices in FIG. 3.

Figure 6:
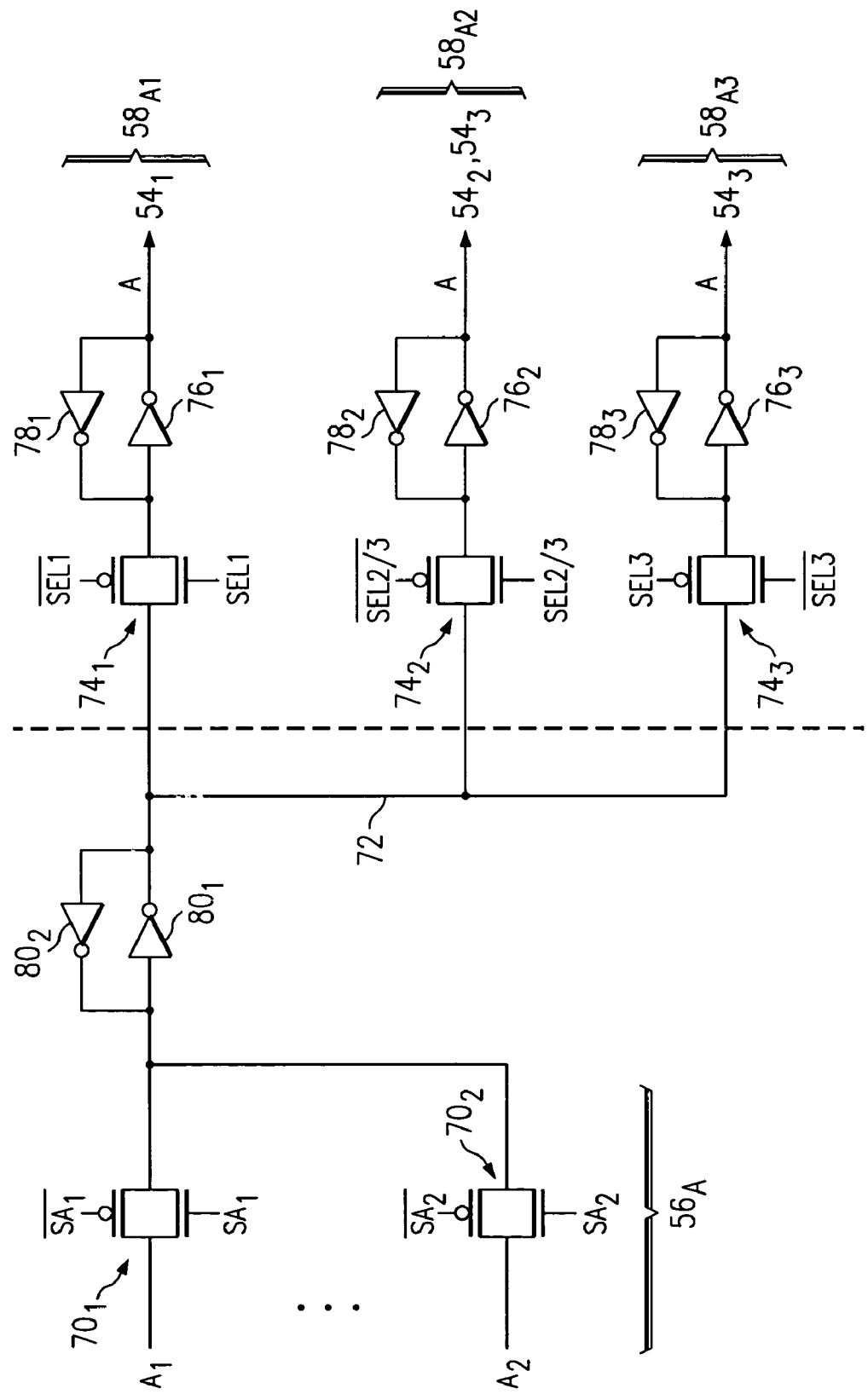
FIG. 6 illustrates a schematic of an alternative static logic preferred embodiment implementation of forwarding multiplexer $56_A$ and switched buffers $58_{A1}$, $58_{A2}$, and $58_{A3}$ from FIG. 3.

FIG. 6 illustrates a schematic of an alternative static logic preferred embodiment implementation of forwarding multiplexer 56$_A$ and switched buffers 58$_{A1}$, 58$_{A2}$, and 58$_{A3}$ from FIG. 3. The embodiment of FIG. 6 includes the same devices as those shown in FIG. 4, with like reference numbers being carried forward from FIG. 4 into FIG. 6 for such devices. In addition, however, an additional pair of inverters 80$_1$ and 80$_2$ are added to the circuitry. More specifically, rather than connecting the outputs of pass gates 70$_1$ and 70$_2$ directly to node 72 as in FIG. 4, instead in FIG. 6 those outputs are connected to the input of an inverter 80$_1$, which has its output connected to node 72. Further, the output of inverter 80$_1$ is also connected to the input of an inverter 80$_2$, which has its output connected to the input of inverter 80$_1$, thereby providing a latch between the inputs (A$_1$ and A$_2$) and node 72.

The operation of the circuitry in FIG. 6 is readily appreciated as comparable in many respects given the comparable circuitry of FIG. 4 and, thus, the reader is referred to the earlier discussion for certain details that are not repeated here. Relative to the differences between the circuitry of FIGS. 4 and 6, however, the addition of the latch inverter pair 80$_1$, and 80$_2$ provides various benefits. First, as compared to the circuitry of FIG. 4, note that in some implementations the passage of a rising signal through two directly connected pass gates as in the case of FIG. 4 (i.e., one in a forwarding multiplexer, another in a switched buffer) may be unacceptably slow. Second, the implementation of FIG. 4 provides the input data to the sub-unit in inverted form since, from input to output, there is only a single signal inversion. In contrast, the implementation of FIG. 6 provides two such inversions, so the data, when output, is in its same form as when input. Lastly, the approach of FIG. 4 requires that the circuitry providing A$_1$ and A$_2$ (and any similar inputs) drive a series connection of two pass gates and an inverter; such an approach in some implementations may provide too large a load and, hence, require additional buffering, where that buffering can thereby provide its own drive power and also lessen the load on the circuitry providing A$_1$ and A$_2$. The approach of FIG. 6, therefore, includes inverters 80$_1$ and 80$_2$ that thereby provide such additional buffering.

Figure 7:
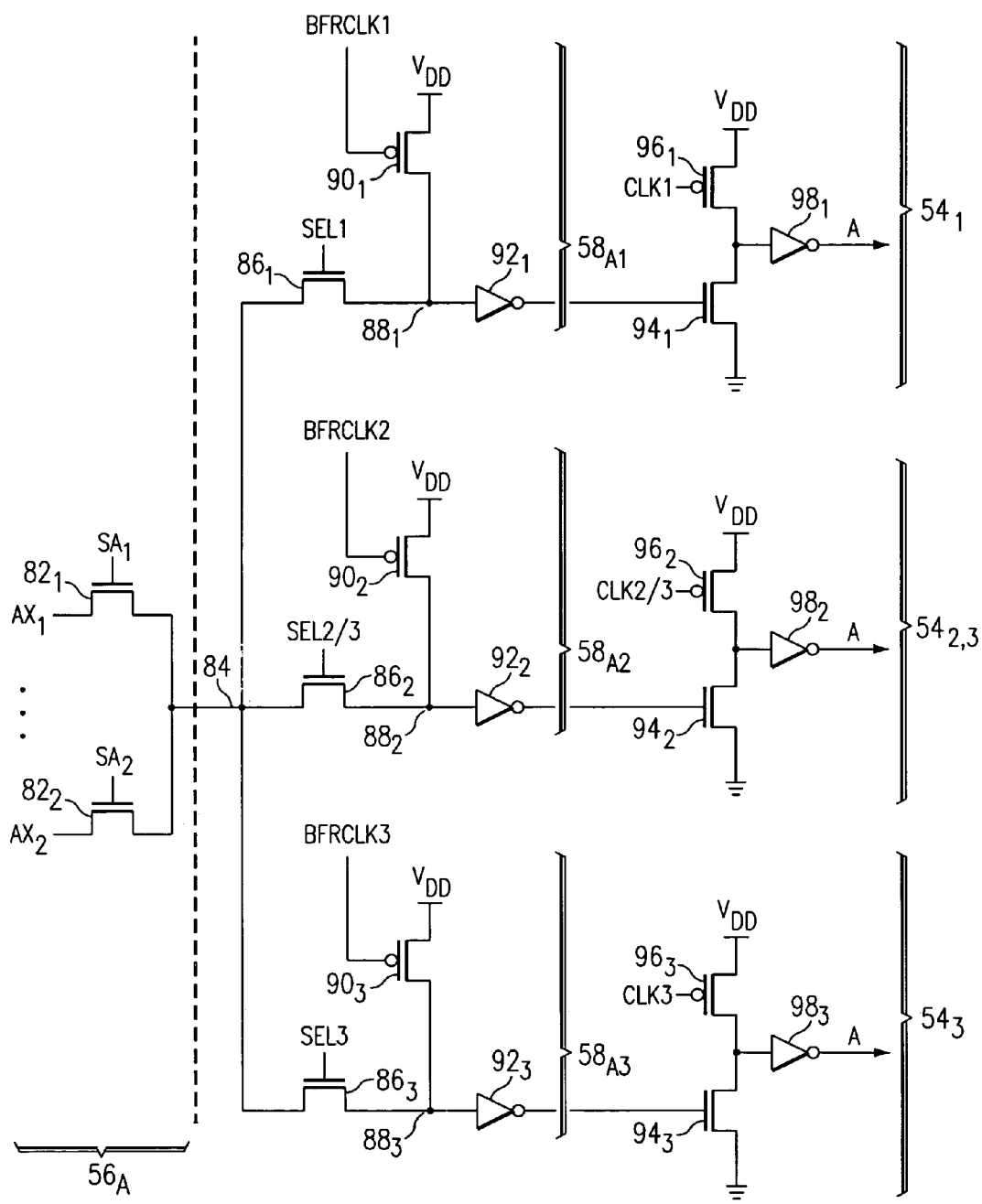
FIG. 7 illustrates a schematic using dynamic logic for a preferred embodiment implementation of forwarding multiplexer $56_A$ and switched buffers $58_{A1}$, $58_{A2}$, and $58_{A3}$ from FIG. 3 using dynamic logic circuitry.

FIG. 7 illustrates a schematic using dynamic logic for a preferred embodiment implementation of forwarding multiplexer 56$_A$ and switched buffers 58$_{A1}$, 58$_{A2}$, and 58$_{A3}$ from FIG. 3 using dynamic logic circuitry; further, one skilled in the art may comparably apply the illustration and following discussion to forwarding multiplexer 56$_B$ and switched buffers 58$_{B1}$, 58$_{B2}$, and 58$_{B3}$ from FIG. 3, but for sake of simplifying the discussion, the FIG. 3 illustration is not duplicated with respect to the comparable forwarding multiplexer 56$_B$ and switched buffers 58$_{B1}$, 58$_{B2}$, and 58$_{B3}$. Additionally, and for reasons discussed later, FIG. 7 also illustrates a first stage that is preferably included in sub-units 54$_1$, 54$_2$, and 54$_3$.

Turning to multiplexer 56$_A$ in FIG. 7, an input AX$_1$ is shown here to correspond to input A$_1$ of FIG. 3, where the added "X" in the signal identifier is intended to depict that the signal is an active low signal; similarly, input A$_2$ from FIG. 3 is shown as input AX$_2$ in FIG. 7, once more with the X indicating an active low signal. Input signal AX$_1$ is connected to a first source/drain of an n-channel transistor 82$_1$, where the second source/drain of n-channel transistor 82$_1$ is connected to a node 84, and the gate of n-channel transistor 82$_1$ is connected to receive a select signal SA$_1$.

Similarly with respect to input AX$_2$, it is connected to a first source/drain of an n-channel transistor 82$_2$, where the second source/drain of n-channel transistor 82$_2$ is connected to node 84, and the gate of n-channel transistor 82$_2$ is connected to receive a select signal SA$_2$. Node 84 provides, in essence, an output of multiplexer 56$_A$ in that, as further detailed below, a transition in node 84 causes a transition for a given clock cycle in only one of switched buffers 58$_{A1}$, 58$_{A2}$, or 58$_{A3}$.

Looking in greater detail to switched buffers 58$_{A1}$, 58$_{A2}$, or 58$_{A3}$ of FIG. 7, node 84 is connected to a first source/drain for each of three n-channel transistors 86$_1$, 86$_2$, and 86$_3$. The gates of n-channel transistors 86$_1$, 86$_2$, and 86$_3$ are connected to respective select signals SEL1, SEL2/3, and SEL3. The second source/drain of each of n-channel transistors 86$_1$, 86$_2$, and 86$_3$ is connected to a corresponding precharge node 88$_1$, 88$_2$, and 88$_3$, and each such precharge node is connected to the drain of a respective p-channel transistor 90$_1$, 90$_2$, and 90$_3$, each such precharge transistor having its source connected to a system voltage level V$_{DD}$. The gates of p-channel transistors 90$_1$, 90$_2$, and 90$_3$ are each connected to a respective clock signal BFRCLK1, BFRCLK2, and BFRCLK3. Each precharge node 88$_1$, 88$_2$, and 88$_3$ is also connected to the input of a respective inverter 92$_1$, 92$_2$, and 92$_3$, and those inverters provide in essence an output of each buffer in that, as further detailed below, only one of those outputs can transition for a given clock cycle, thereby providing a transitioning output signal for a respective one of switched buffers 58$_{A1}$, 58$_{A2}$, or 58$_{A3}$.

Looking now to the interface in FIG. 7 between the switched buffers and a first stage of the three illustrated sub-units, the output of each inverter 92$_1$, 92$_2$, and 92$_3$ is connected to the gate of a respective n-channel transistor 94$_1$, 94$_2$, and 94$_3$. The source of each n-channel transistor 94$_1$, 94$_2$, and 94$_3$ is connected to ground, while the drain of each such transistor is connected to the drain of a corresponding p-channel transistor 96$_1$, 96$_2$, and 96$_3$ having its source connected to V$_{DD}$. The gates of p-channel transistors 96$_1$, 96$_2$, and 96$_3$ are connected to receive respective clock signals CLK1, CLKK2/3, and CLK3. The drain of each p-channel transistor 96$_1$, 96$_2$, and 96$_3$ is also connected to the input of a respective inverter 98$_1$, 98$_2$, and 98$_3$, and the output of each of those inverters provides a respective output to additional circuitry within each designated sub-unit. Lastly, note that the illustration toward the right side of FIG. 7 as it relates to the first stage of the three illustrated sub-units is vastly simplified as compared to an actual implementation of those sub-units, as should be appreciated by one skilled in the art. Specifically, each such single depicted stage is provided to illustrate the clocking in of the updated data into a given sub-unit, but it should be understood that in actuality each sub-unit is likely to comprise a considerably more complex set of transistors configured to begin the necessary operations to achieve the function of the corresponding sub-unit (i.e., adding, logic, and so forth).

Figure 8:
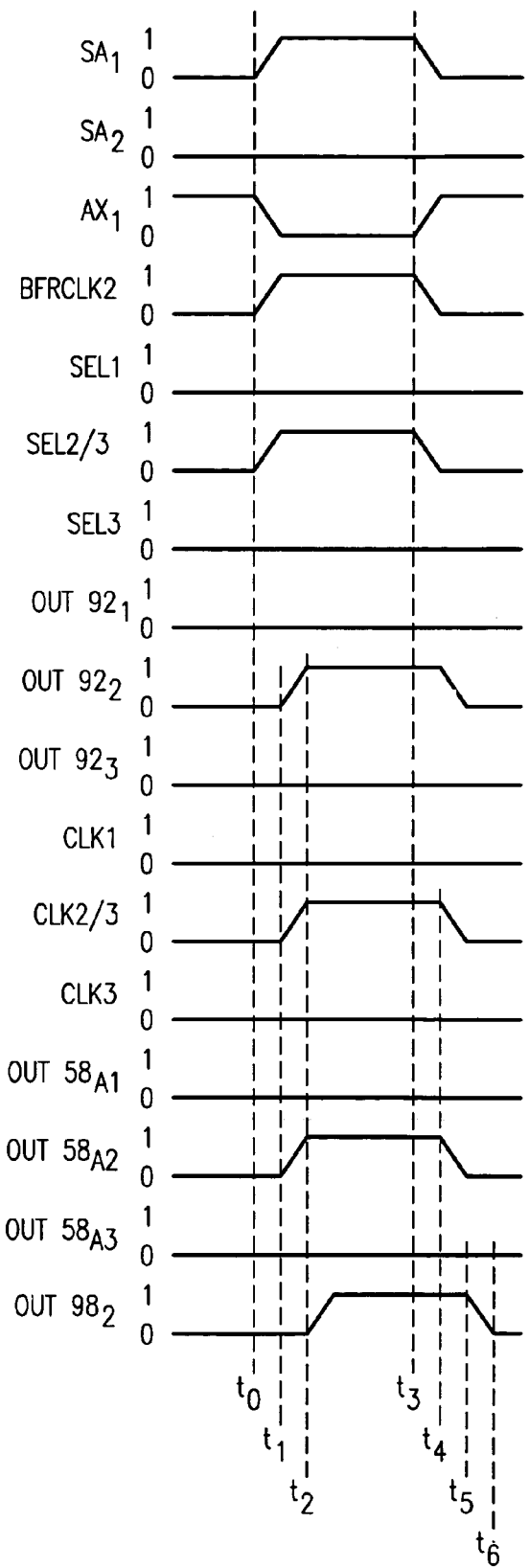
FIG. 8 illustrates a timing diagram of the example where forwarding multiplexer $56_A$ selects the $AX_1$ data input and switched buffer $58_{A2}$ provides the data on that input to subunits $54_2$ and $54_3$.

The operation of forwarding multiplexer 56$_A$ and switched buffers 58$_{A1}$, 58$_{A2}$, and 58$_{A3}$, and the first stage of sun-units 54$_1$, 54$_2$, and 54$_3$ from FIG. 7 is now described through an example and further in view of the timing diagram of FIG. 8. By way of introduction, FIG. 8 illustrates the example where forwarding multiplexer 56$_A$ selects the AX$_1$ data input and switched buffer 58$_{A2}$ provides the data on that input to sub-units 54$_2$ and 54$_3$. Just prior to time t$_0$, each of the six p-channel transistors receives a low signal at its gate (see signals SEL$_1$, SEL$_{2/3}$, SEL$_3$, CLK$_1$ CLK$_{2/3}$, and CLK$_3$). Generally in the art of dynamic logic, such a time period is referred to as the precharge phase. As a result, each such p-channel transistor is enabled, thereby connecting $V_{DD}$ from its source to its drain and providing a precharge voltage to a logic high level at the drain. At the same time, therefore, each such precharge voltage is connected to a corresponding inverter, which in response outputs a logic low signal (see signals OUT $92_1$, OUT $92_2$, OUT $92_3$, OUT $58_{A1}$, OUT $58_{A2}$, and OUT $58_{A3}$).

Continuing with the operation of the circuitry of FIG. 7, at time $t_0$, the evaluate phase of operation commences; in the present embodiment, during the evaluate phase only one gate signal for forwarding multiplexer $56_A$ transitions. In the present example wherein data $AX_1$ is to be selected, then the corresponding gate signal $SA_1$ transitions from low to high. To further illustrate the present example, assume that the data $AX_1$ is active, and since it is an active low signal, then by time $t_0$ it will transition low. Accordingly, this low signal is connected through the source/drain path of n-channel transistor $82_1$. Also at $t_0$, only one of the n-channel transistors $86_1$, $86_2$, and $86_3$ is enabled, where the one enabled n-channel transistor corresponds to the switched buffer that is connected to the sub-unit(s) that is desired for execution in the immediately upcoming execution cycle. Also at $t_0$, only one of the p-channel transistors $90_1$, $90_2$, and $90_3$ is disabled, where the one disabled p-channel transistor also corresponds to the switched buffer that is connected to the sub-unit(s) that is desired for execution in the immediately upcoming execution cycle. In the present example wherein it is desired that switched buffer $58_{A2}$ provides the data on its input to sub-units $54_2$ and $54_3$, then also at to the gate signal SEL2/3 is asserted high and BFRCLK2 transitions high. Note, therefore, that both n-channel transistors $82_1$ and $86_2$ are enabled and p-channel transistor $90_2$ is disabled; as a result, the pre-existing precharge voltage at precharge node $88_2$ is connected through these two enabled n-channel transistors to the low value of $AX_1$ such that the precharge voltage is discharged (e.g., to ground). Consequently, after a small delay time associated with this discharge, and then occurring as shown at time $t_1$, the output of inverter $92_2$ rises and completes its transition at time $t_2$; meanwhile, because n-channel transistors $86_1$ and $86_3$ remain disabled and respective precharge nodes $88_1$ and $88_3$ remain precharged (as further augmented by keeping BFRCLK1 and BRFCLK3 low), then the outputs of inverters $92_1$ and $92_3$ remain low. Also by $t_1$, only one of the p-channel precharge transistors $96_1$, $96_2$, and $96_3$, connected to respective inverters $98_1$, $98_2$, and $98_3$ is disabled, where the one disabled precharge transistor is in the first stage of the sub-unit(s) that is desired for execution in the immediately upcoming execution cycle. In the present example, therefore, at $t_1$ CLK2/3 is shown to transition high and complete its transition at time $t_2$, thereby disabling p-channel transistor $96_2$. At the same time, recall that inverter $92_2$ is providing a high transition to n-channel transistor $94_2$; in this regard, n-channel transistor $94_2$ operates as a discharge transistor (as would n-channel transistors $94_1$ and $94_3$ if either were enabled), thereby connecting the precharge voltage at the drain of p-channel transistor $96_2$ to ground through the enabled n-channel discharge transistor $94_2$. At the same time, this discharge transition from high to low is connected to the input of inverter $98_2$, and thus at the same time there is a corresponding upward transition from low to high at the output of inverter $98_2$, as shown at $t_2$. Accordingly, this upward transition thereby represents the active updated data $A_1$ (or $AX_1$ in its low state) as being output from switched buffer $58_{A2}$ to sub-units $54_2$ and $54_3$.

Completing some observations regarding the operation of the circuitry of FIG. 7, at time $t_3$, the precharge phase again commences. Accordingly, each precharge transistor is either maintained in its precharge phase or placed into that phase if it were not already there due to the immediately-preceding evaluate phase. In the present example and embodiment, then, BFRCLK2 transitions low while BFRCLK1 and BRFCLK3 remain low, thereby enabling or continuing to enable each of p-channel transistors $90_1$, $90_2$, and $90_3$ and consequently causing the precharge of their respective precharge nodes $88_1$, $88_2$, and $88_3$. In addition, precharge transistors $96_1$ and $96_3$ are maintained low with no transition in their respective gate signals CLK1 and CLK3, while precharge transistor $96_2$, disabled in the immediately-preceding evaluate phase, is then switched back to a precharge phase by transitioning its gate signal, CLK2/3, from high to low, starting at time $t_4$. Upon returning to the precharge phase, once more the outputs of each of inverters $92_1$, $92_2$, $92_3$, $98_1$, $98_2$, and $98_3$ will present a logic low output signal, as shown following the final transition starting at time $t_5$ and completed by time $t_6$.

Having described the circuitry of FIG. 7, note that the first stage in each sub-unit includes only a single n-channel discharge $94_1$, $94_2$, and $94_3$. In an alternative embodiment, the source/drain path of an additional n-channel transistor is connected serially with the source/drain path of each respective n-channel discharge $94_1$, $94_2$, and $94_3$, and with the gate of each such additional n-channel transistor being connected to the clock signal corresponding to the sub-unit. For example, with respect to sub-unit $54_1$, an additional n-channel transistor is connected between ground and the source of n-channel transistor $94_1$, and the gate of the additional n-channel transistor is connected to receive CLK1. Note that the use of these additional transistors further ensures proper transition during the precharge and evaluate phase, as the additional transistor operates in a complementary fashion to the p-channel precharge transistor in the sub-unit. Although this alternative may be useable in some implementations, preferably it is eliminated in order to reduce delay and clock power dissipation. However, since these additional transistors are not used, when the illustrated precharge transistors in the sub-units are gated off (e.g., by BFRCLK2 going high in the preceding example), their inputs also must remain disabled because otherwise crowbar current would result. The connections and operation of the enabling of only one of n-channel transistors $86_1$, $86_2$, and $86_3$ at a time provides this result. Alternatively, however, if the additional n-channel transistors are used, then each sub-unit may be clock gated without providing separately gated copies of the input data. In FIG. 3, for example, sub-unit $54_2$ and $54_3$ share data inputs on both the A and B data. Thus, if the above-described additional n-channel transistor is included, then this transistor may be used to disable one of sub-units $54_2$ and $54_3$ while the other sub-unit is enabled and receives the input data transition.

An additional observation is noteworthy with respect to the drive demands of the preferred embodiments versus that of the prior art. In this regard, note in the preferred embodiment that inverters $92_1$, $92_2$, and $92_3$ are sized so that they are capable of driving the individual loads with acceptable delay. In comparison and returning to the prior art FIG. 1, the output inverter (not expressly shown) for forwarding multiplexer $16_A$ is required to drive all the loads and would be approximately equal in size to the sum of the three inverters $92_1$, $92_2$, and $92_3$ of FIG. 7. It is important to note that since, in FIG. 7, only one of the output select signals (i.e., SEL1, SEL2/3, SEL3) is active at a time, then the n-channel transistors $82_1$ and $82_2$ of forwarding multiplexer $56_A$ are sized to drive only the one of inverters $92_1$, $92_2$, and $92_3$ that will be enabled at a time and also the circuitry driving $AX_1$ and $AX_2$ is likewise sized to drive a smaller load. Accordingly, the size of such transistors may be on the order of one-third of that required to drive all sub-units at once. Further, the only delay penalty imposed by adding additional outputs (e.g., to add more sub-units) is the diode capacitance on node 84. Accordingly, by activating only one of n-channel transistors 86$_1$, 86$_2$, and 86$_3$ at a time, only one-third of the output load must be driven at a time, improving circuit delay, and only one of the three subunits need be activated, reducing power consumption.

Figure 9:
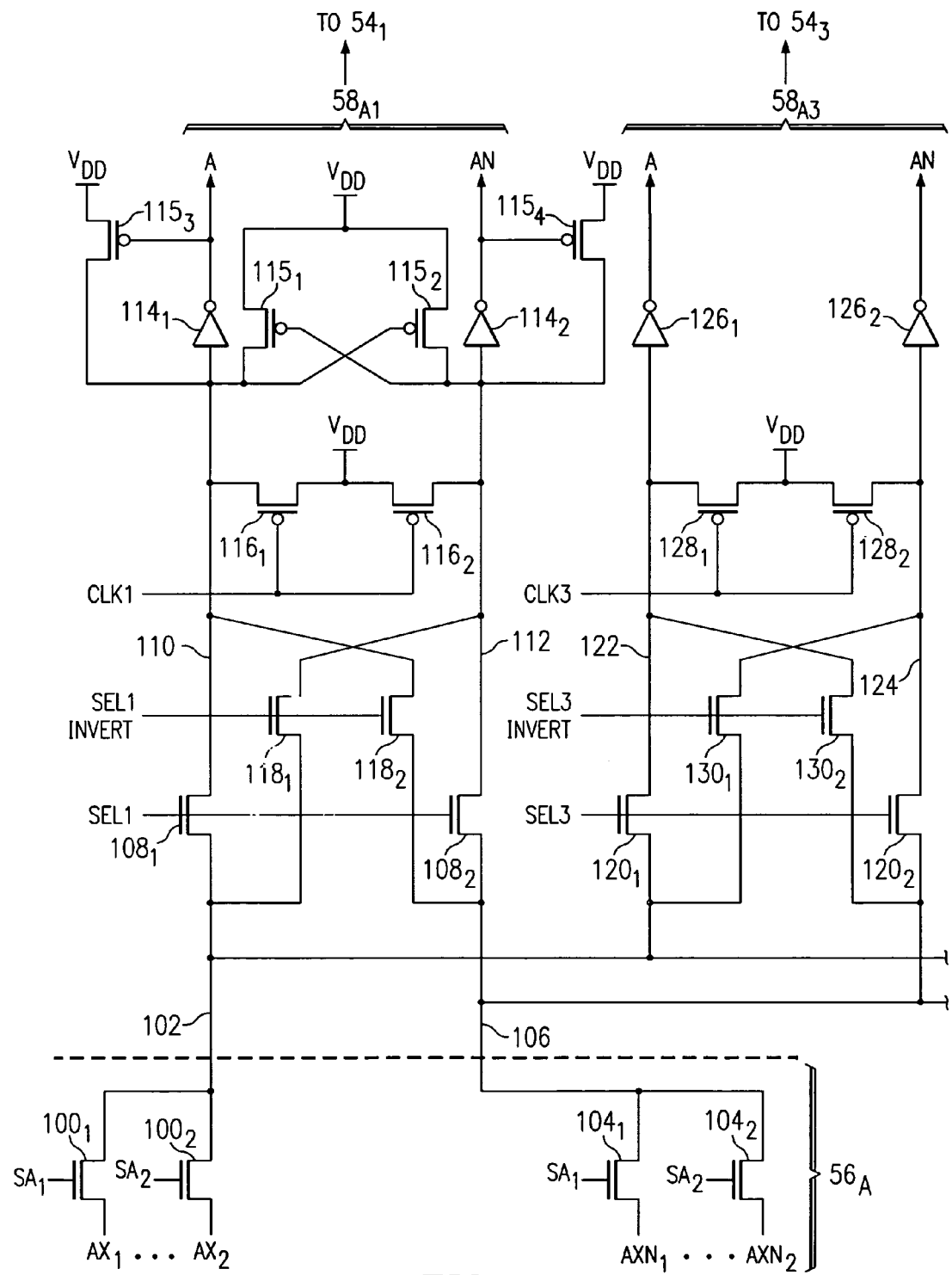
FIG. 9 illustrates a schematic of an alternative embodiment using dynamic logic for switched buffers $58_{A1}$ and $58_{A3}$.

FIG. 9 illustrates a schematic of an alternative embodiment using dynamic logic for switched buffers 58$_{A1}$, and 58$_{A3}$, both of which are connected to forwarding multiplexer 56$_A$. By way of introduction to the embodiment of FIG. 9, it demonstrates that additional logic can be incorporated into the structure of FIG. 7 with little drive penalty and thereby speeding up the operation of downstream gates in the sub-units. More particularly, in the preferred embodiment, it is desirable to incorporate some additional functionally in connection with these devices where such functionality, as shown below, is directed to providing an additional ability to selectively invert the input data, yet there is no additional delay associated solely with this selectivity aspect because the operation of the transistor providing such functionality is concurrent with devices already described.

Looking to the specific circuitry in FIG. 9, it includes forwarding multiplexer 56$_A$ in the same general manner as discussed above in FIG. 7. However, in FIG. 9 dual rail (i.e., complementary) signals are provided as is typically implemented in a dynamic logic architecture. In the instance of FIG. 9, therefore, the active low data is shown with a suffix "X" as in the case of $AXN_1$ and $AX_2$, while the negative rail signals have an "N" suffice as in the case of $AXN_1$ and $AXN_2$. The active low data $AX_1$ and $AX_2$ are connected through the source/drain paths of respective n-channel transistors 100$_1$ and 100$_2$ to a node 102, and the negative rail data $AXN_1$ and $AXN_2$ are connected through the source/drain paths of respective n-channel transistors 104$_1$ and 104$_2$ to a node 106. The gates of n-channel transistors 100$_1$ and 100$_2$ are connected to receive respective control signals $SA_1$ and $SA_2$, and likewise the gates of n-channel transistors 104$_1$ and 104$_2$ are also connected to receive the respective control signals $SA_1$ and $SA_2$.

Looking now to switched buffer 58$_{A1}$ in FIG. 9, node 102 is connected to a first source/drain of an n-channel transistor 108$_1$, which has it gate connected to receive a SEL1 signal and its second source/drain connected to a node 110. Similarly, node 106 is connected to a first source/drain of a n-channel transistor 108$_2$, which also has it gate connected to receive the SEL1 signal and its second source/drain connected to a node 112. Node 110 is connected to the input of an inverter 114$_1$, and the output of inverter 114$_1$ provides the selected data A to sub-unit 54$_1$. Similarly, node 112 is connected to the input of an inverter 114$_2$, and the output of inverter 114$_2$ provides the complement of the selected data A, shown as AN, to sub-unit 54$_1$. A pair of p-channel precharge transistors 116$_1$ and 116$_2$ are connected between nodes 110 and 112, with each such precharge transistor having a first source/drain connected to a respective one of nodes 110 and 112 and a second source/drain connected together and to $V_{DD}$. Also shown in connection with the output of dual rail signals in switched buffer 58$_{A1}$ are four p-channel transistors 115$_1$, 115$_2$, 115$_3$, and 115$_4$. Note that these devices are known in the dual rail art and are shown by way of completion, but since they are known they are not shown in additional Figures so as to simplify those illustrations and discussions. However, such devices are contemplated in the preferred embodiments as they assist, as described below, in the maintenance of the dual rail outputs. Looking briefly then to these devices, the sources of p-channel transistors 115$_1$ and 115$_2$ are connected to $V_{DD}$, their gates are cross-coupled to the opposing transistors drain, and the drain of p-channel transistors 115$_1$ and 115$_2$ are connected to nodes 110 and 112, respectively. The sources of p-channel transistors 115$_3$ and 115$_4$ are connected to $V_{DD}$, their gates are connected to the outputs of inverters 114$_1$ and 114$_2$, respectively, their drains are connected to nodes 110 and 112, respectively. Lastly, an n-channel transistor 118$_1$ has a first source/drain connected to node 102 and a second source/drain connected to node 112, while another n-channel transistor 118$_2$ has a first source/drain connected to node 106 and a second source/drain connected to node 110. The gates of n-channel transistors 118$_1$ and 118$_2$ are both connected to receive a signal SEL1INVERT.

Looking now to switched buffer 58$_{A3}$ in FIG. 9, it is constructed in a manner comparable to switched buffer 58$_{A1}$, thereby providing a comparable functionality yet for different reasons discussed below. With reference now to the devices and connections in switched buffer 58$_{A3}$, node 102 is connected to a first source/drain of a n-channel transistor 120$_1$, which has it gate connected to receive a SEL3 signal and its second source/drain connected to a node 122. Similarly, node 106 is connected to a first source/drain of an n-channel transistor 120$_2$, which also has its gate connected to receive the SEL3 signal and its second source/drain connected to a node 124. Node 122 is connected to the input of an inverter 126$_1$, and the output of inverter 126$_1$ provides the selected data A to sub-unit 54$_3$. Similarly, node 124 is connected to the input of an inverter 126$_2$, and the output of inverter 126$_2$ provides the complement of the selected data A, shown as AN, to sub-unit 54$_3$. A pair of p-channel precharge transistors 128$_1$ and 128$_2$ are connected between nodes 122 and 124, with each such precharge transistor having a first source/drain connected to a respective one of nodes 122 and 124 and a second source/drain connected together and to $V_{DD}$. Lastly, an n-channel transistor 130$_1$ has a first source/drain connected to node 102 and a second source/drain connected to node 124, while another n-channel transistor 130$_2$ has a first source/drain connected to node 106 and a second source/drain connected to node 122. The gates of n-channel transistors 130$_1$ and 130$_2$ are both connected to receive a signal SEL3INVERT.

The operation of switched buffer 58$_{A1}$ and switched buffer 58$_{A3}$ are comparable and, thus, given the skill in the art, the following discussion focuses on the former with only brief additional details stated relative to the latter. As a dynamic logic circuit, during a precharge phase precharge transistors 116$_1$ and 116$_2$ are enabled by setting CLK1 low, thereby precharging nodes 110 and 112 high and consequently providing low outputs out of inverters 114$_1$ and 114$_2$. Next during the evaluate phase, forwarding multiplexer 56$_A$ operates in the same manner as described earlier with respect to FIG. 7, but in the case of FIG. 9 dual rail signals are provided. For example, assume that data $A_1$ is to be selected, which in FIG. 9 is represented by the active low signal $AX_1$ and its negative rail counterpart, $AXN_1$. Accordingly, $SA_1$ is asserted, thereby enabling both n-channel transistors 100$_1$ and 104$_1$ and consequently coupling the desired data states to nodes 102 and 106, respectively. Also during the evaluate phase, and when it is desired to route the desired data to the output of switched buffer 58$_{A1}$, then only one of SEL1 or SEL1INVERT is enabled. Each of these cases is discussed separately, below.

When it is desired to route the data from nodes 102 and 106 directly to inverters $114_1$ and $114_2$, respectively, then as in the case of FIG. 7, the signal SEL1 is asserted. When SEL1 is asserted, it enables n-channel transistors $108_1$ and $108_2$, coupling the data states at nodes 102 and 106 to nodes 110 and 112, respectively. Since these data states are complementary, then one of nodes 110 and 112 is discharged, thereby causing the output of the corresponding one of inverters $114_1$ and $114_2$ to rise. Thus, at this point during the evaluate phase, the outputs of $114_1$, and $114_2$ provide dual rail outputs.

Switched buffer $58_{A1}$ also provides the operability to swap the data from node 102 to the input of inverter $114_2$ and from node 106 to the input of inverter $114_1$, as accomplished by asserting SEL1INVERT. Specifically, when SEL1INVERT is asserted, it enables n-channel transistors $118_1$ and $118_2$. Further, because only one of SEL1 or SEL1INVERT can be asserted during a single evaluate phase, then during the assertion of SEL1INVERT n-channel transistors $108_1$ and $108_2$ remain disabled because SELL is not asserted. Since n-channel transistors $118_1$ and $118_2$ are enabled, then the data states at nodes 102 and 106 are swapped to nodes 112 and 110, respectively, which results in a logical data inversion. As in the non-swapped case, since these data states are complementary, then one of nodes 110 and 112 is discharged, there causing the output of the corresponding one of inverters $114_1$ and $114_2$ to rise, thereby providing dual rail outputs at this point during the evaluate phase. Further, with the data as provided at the outputs of inverters $114_1$ and $114_2$, p-channel transistors $115_1$ through $115_4$ operate to maintain the output data in this state. Given the swapping functionality, note that such may be desired to support a subtract operation by sub-unit 54, which receives the data, where B-A is performed by determining $B+AN_x+1$, that is, by adding the selected B data to the logical inverse of the selected A data and adding in a carrying bit. Since the inversion function is required and would cost a level of transistors in the ALU, then instead that function can be removed from the ALU and included in switched buffer $58_{A1}$ as shown in FIG. 9, so when combined with the selectivity operation it does not add any more series transistors than would be required to accommodate the needed functionality otherwise to be included in the ALU.

As discussed above, switched buffer $58_{A3}$ is comparable to that of switched buffer $58_{A1}$, with the difference generally being the intended destination of the data instead being to sub-unit $54_3$. By comparing the schematics of the two switched buffers, one skilled in the art will readily appreciate that switched buffer $58_{A3}$ also may be controlled by asserting only one of SEL3 or SEL3INVERT during a single evaluate phase, thereby either passing data directly from nodes 102 and 106 out of inverters $126_1$ and $126_2$, respectively, or alternatively by swapping the data such that the node 102 data is passed via inverter $126_2$ while the node 106 data is passed via inverter $126_1$. Note that the data swapping function provided by switched buffer $58_{A3}$ is provided to sub-unit $54_3$, which recall from the discussion of FIG. 3 provides the data A to indicate the extent of the shift to be performed. This indication also must sometimes be inverted, which could be accomplished inside sub-unit $54_3$. However, as was the case above for buffer $58_{A1}$ which moves an inverting function of the ALU (i.e., sub-unit $54_1$) into buffer $58_{A1}$, the preferred embodiment also moves the inversion function of the shift extent data to switched buffer $58_{A3}$. In doing so, again the level of n-channel transistors $120_1$, $120_2$, $130_1$, and $130_2$, that provide data selection in the buffer also may provide the data inversion (i.e., swapping) function.

Note that the inversion function with respect to the shift extent data is done to change a rotate left into a rotate right in view of the notion that a 32-bit rotate right by M bits is equivalent to a left shift by -M bits.

Figure 10:
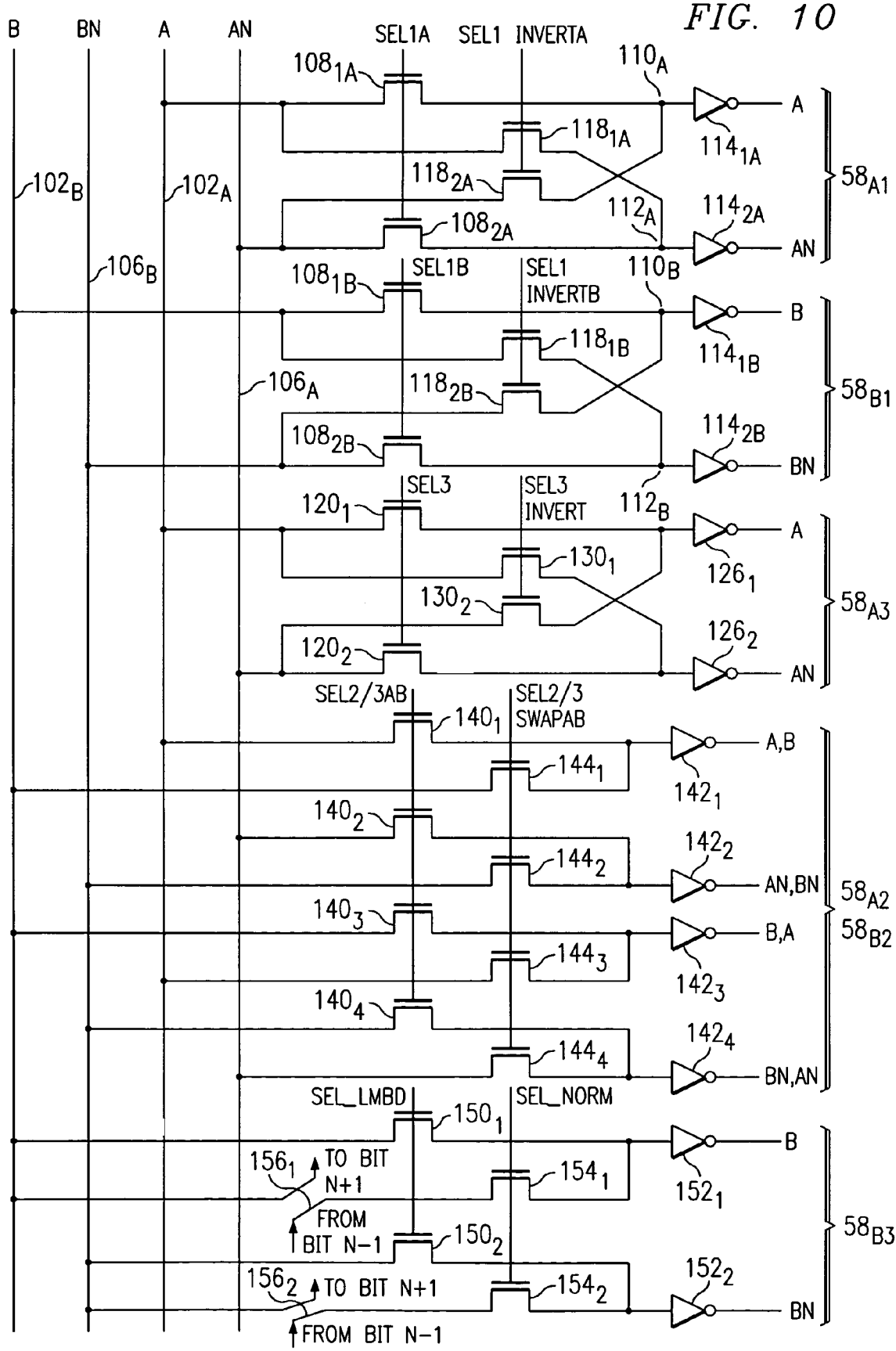
FIG. 10 illustrates a schematic of an embodiment using dynamic logic for all of switched buffers $58_{A1}$, $58_{A2}$, $58_{A3}$, $58_{B1}$, $58_{B2}$, and $58_{B3}$ of FIG. 3.

FIG. 10 illustrates a schematic of an embodiment using dynamic logic for all of switched buffers $58_{A1}$, $58_{A2}$, $58_{A3}$, $58_{B1}$, $58_{B2}$, and $58_{B3}$ of FIG. 3. For sake of simplifying the illustration, the forwarding multiplexers $56_A$ and $56_B$ of FIG. 3 are not shown in FIG. 10, and neither are precharging circuits, both of which are readily understood to be included by one skilled in the art. By way of introduction, switched buffer $58_{A1}$ from FIG. 10 is comparable to that illustrated in FIG. 9 and switched buffer $58_{A3}$ is the same in FIGS. 9 and 10; thus, lesser detail is presented with respect to those buffers as the reader is assumed familiar with the earlier discussion of FIG. 9. Additionally, certain concepts also introduced with respect to FIG. 9, such as dual rail functionality and swapping of inputs to outputs are also included in various of the circuits in FIG. 10, where such aspects also were described above. Thus, the following discussion focuses on the circuit connections and additional aspects that the FIG. 10 circuit provides beyond that of FIG. 9.

Starting at the top of FIG. 10, it illustrates switched buffers $58_{A1}$ and $58_{B1}$, which as illustrated in FIG. 3 provide data values A and B, respectively, to sub-unit $54_1$. Switched buffer $58_{A1}$ has the same connections as shown in FIG. 9, although to avoid confusion with switched buffer $58_{B1}$ the reference identifiers and signal names are further modified so as to distinguish circuits and signals relating to data A from circuits and signals relating to data B. Thus, each circuit element in switched buffer $58_{A1}$ of FIG. 10 adds the letter "A" to its subscript as compared to the illustration of FIG. 9, and each signal name has the letter "A" added to it as compared to the illustration of FIG. 9. For example, the FIG. 10 n-channel transistor $108_{1A}$ corresponds to the FIG. 9 n-channel transistor $108_1$, and the FIG. 10 signal SEL1A corresponds to (the FIG. 9 signal SELL. These same convention modifications are also used with respect to nodes 102 and 106, thereby providing those nodes relative to the data A and its complement ($102_A$ and $106_A$) and to the data B and its complement ($102_B$ and $106_B$). Given these conventions, one skilled in the art should readily appreciate that switched buffer $58_{B1}$ is constructed in the same general fashion as switched buffer $58_{A1}$, with the exception that different control signals are used and its input data is B and BN.

The operation of switched buffers $58_{A1}$ and $58_{B1}$ of FIG. 10 also may be readily appreciated given the previous discussion of the operation of switched buffer $58_{A1}$ and, thus, only a brief discussion is now provided. With respect to switched buffer $58_{A1}$, when for a given execute cycle sub-unit $54_1$ requires the operands of A and AN directly at outputs A and AN, respectively, then first nodes $110_A$ and $112_A$ are precharged in a precharge phase, and in the immediately following evaluate phase SEL1A is asserted while SEL1INVERTA is not asserted. As a result, nodes $110_A$ and $112_A$ are connected, respectively through n-channel transistors $108_{1A}$A and $108_{2A}$, to nodes $102_A$ and $106_A$. Thus, based on the input data states, one of nodes $110_{1A}$ and $112_A$ discharges, thereby presenting complementary outputs from inverters $114_A$ and $114_{2A}$. Conversely, when for a given execute cycle sub-unit $54_1$ requires the operands of A and AN swapped to outputs AN and A, respectively, then first nodes $110_A$ and $112_A$ are precharged in a precharge phase, and in the immediately following evaluate phase SEL1A is not asserted while SEL1INVERTA is asserted. As a result, nodes $110_A$ and $112_A$ are connected, respectively through n-channel transistors $118_{24}$ and $118_{14}$, to nodes $106_A$ and $102_A$. Again, based on the input data states, one of nodes $110_A$ and $112_A$ discharges, thereby presenting complementary outputs from inverters $114_{1A}$ and $114_{2A}$. Switched buffer $58_{B1}$ operates in the same fashion as switched buffer $58_{A1}$, but relative to the inputs B and BN and its corresponding select signals. Thus, when for a given execute cycle subunit $54_1$ requires the operands of B and BN directly at outputs B and BN, respectively, then first nodes $110_B$ and $112_B$ are precharged in a precharge phase, and in the immediately following evaluate phase SEL1B is asserted while SEL1INVERTB is not asserted. Conversely, when for a given execute cycle sub-unit $54_1$ requires the operands of B and BN swapped to outputs BN and B, respectively, then first nodes $110_B$ and $112_B$ are precharged in a precharge phase, and in the immediately following evaluate phase SEL1B is not asserted while SEL1INVERTB is asserted.

Turning now to switched buffer $58_{A3}$ of FIG. 10, recall from above that it is the same as illustrated in FIG. 9, although as stated above FIG. 10 does not explicitly also illustrate forwarding multiplexer $56_A$. Thus, one skilled in the art may readily refer to the earlier discussion of FIG. 9 to further appreciate the connection to that multiplexer as well as the operation of switched buffer $58_{A3}$.

For the sake of illustrating the use of the same control signals as well as the operability of swapping inputs to outputs, FIG. 10 illustrates together the construction and operation of switched buffers $58_{A2}$ and $58_{B2}$. By way of introduction to this illustration, recall from FIG. 3 that switched buffer $58_{A2}$ provides the A data to both sub-units $54_2$ and $54_3$, and switched buffer $58_{B2}$ provides the B data to both sub-units $54_2$ and $54_3$. Looking then to FIG. 10, a single control signal SEL2/3AB is connected to the gates of four n-channel transistors $140_1$, $140_2$, $140_3$, and $140_4$. A first source/drain of n-channel transistors $140_1$, $140_2$, $140_3$, and $140_4$ is connected respectively to nodes $102_A$, $106_A$, $102_B$, and $106_B$. A second source/drain of n-channel transistors $140_1$, $140_2$, $140_3$, and $140_4$ is connected respectively to an input of inverters $142_1$, $142_2$, $142_3$, and $142_4$. Additionally, a single control signal SEL2/3SWAPAB is connected to the gates of four n-channel transistors $144_1$, $144_2$, $144_3$, and $144_4$. A first source/drain of n-channel transistors $144_1$, $144_2$, $144_3$, and $144_4$ is connected respectively to nodes $102_B$, $106_B$, $102_A$, and $106_A$. A second source/drain of n-channel transistors $144_1$, $144_2$, $144_3$, and $144_4$ is connected respectively to an input of inverters $142_1$, $142_2$, $142_3$, and $142_4$. The output of inverters $142_1$, $142_2$, $142_3$, and $142_4$ are connected to sub-units $54_2$ and $54_3$.

The operation of the combined illustration of switched buffers $58_{A2}$ and $58_{B2}$ is now described. With respect to switched buffers $58_{A2}$, and $58_{A2}$, when for a given execute cycle either sub-unit $54_2$ or $54_3$ requires the operands of A and AN at the outputs of respective inverters $142_1$ and $142_2$ and sub-unit $54_2$ or $54_3$ requires the operands of B and BN at the outputs of respective inverters $142_3$ and $142_4$, then first the inputs to all of inverters $142_1$, $142_2$, $142_3$, and $142_4$ are precharged in a precharge phase, and in the immediately following evaluate phase SEL2/3AB is asserted while SEL2/3SWAPAB is not asserted. As a result, the input to inverter $142_1$ is connected to node $102_A$ to receive data A and the input to inverter $142_2$ is connected to node $106_A$ to receive AN, while at the same time the input to inverter $142_3$ is connected to node $102_B$ to receive data B and the input to inverter $142_4$ is connected to node $106_B$ to receive BN. Thus, the collective outputs, from top to bottom, of switched buffers $58_{A2}$ and $58_{B2}$ provide the output signals shown in the first column of outputs provided in FIG. 10 (i.e., A, AN, B, and BN). Conversely, with respect to switched buffers $58_{A2}$, and $58_{A2}$, when for a given execute cycle either sub-unit $54_2$ or $54_3$ requires the operands of B and BN at the respective outputs of inverters $142_1$ and $142_2$ and either sub-unit $54_2$ or $54_3$ requires the operands of A and AN directly at the respective outputs of inverters $142_3$ and $142_4$, then also the inputs to all of inverters $142_1$, $142_2$, $142_3$, and $142_4$ are precharged in a precharge phase, and in the immediately following evaluate phase SEL2/3AB is not asserted while SEL2/3SWAPAB is asserted. As a result, the input to inverter $142_1$ is connected to node $102_B$ to receive data B and the input to inverter $142_2$ is connected to node $106_B$ to receive BN, while at the same time the input to inverter $142_3$ is connected to node $102_A$ to receive data A and the input to inverter $142_4$ is connected to node $106_A$ to receive AN. Thus, the collective outputs, from top to bottom, of switched buffers $58_{A2}$ and $58_{B2}$ provide the output signals shown in the first column of outputs provided in FIG. 10 (i.e., B, BN, A, and AN). Thus, in this latter instance, it may be seen that the A and B inputs (and their complements) are effectively swapped by the combined circuitry of switched buffers $58_{A2}$ and $58_{B2}$.

Given the preceding discussion of switched buffers $58_{A2}$ and $58_{B2}$ of FIG. 10, various observations are also noteworthy. First, the A and B data outputs can be swapped, such as on a byte granularity basis (using replicate circuits for multiple bits). This is useful in a preferred processor that includes byte-granularity shift operations by sub-unit $54_3$, where the two 32 bit data inputs are concatenated into a 64 bit number, following which the number is right-shifted by one, two, or three bytes, and the bottom 32 bits are output. This can be accomplished by a rotate operation in the shifter unit, provided the A and B data inputs are swapped at the correct boundary. Other pack and unpack instructions also require swapped A and B inputs. Accordingly, the preferred embodiment provides these capabilities. In addition, note that the control signals SEL2/3AB and SEL2/3SWAPAB are shared between the A and B data in a manner such that each input value (A, AN, B, BN) is only connected to one of the four inverters $142_1$, $142_2$, $142_3$, and $142_4$, at a time. As a result, any given input data value A, AN, B, BN in one evaluate cycle can be capacitively loaded by only one inverter, again reducing total capacitive load and increasing device speed. If, for some instructions, it is desired to turn on only one of the outputs (and its complement) as opposed to both A and B, then the A and B control signals in such an alternative embodiment are separated, creating four control signals instead of two. In such a case, there still should be enforced a rule that each input cannot simultaneously drive more than one output inverter during a single evaluate cycle.

Completing FIG. 10, at the bottom it illustrates switched buffer $58_{B3}$, which as illustrated in FIG. 3 provides the data value B to sub-unit $54_4$. A single control signal SEL_LMBD is connected to the gates of two n-channel transistors $150_1$ and $150_2$. A first source/drain of n-channel transistors $150_1$ and $150_2$ is connected, respectively, to node $102_B$ and $106_B$, and a second source/drain of n-channel transistors $150_1$, and $150_2$ is connected, respectively, to an input of inverters $152_1$ and $152_2$. A single control signal SEL_NORM is connected to the gates of two n-channel transistors $154_1$ and $154_2$. A first source/drain of n-channel transistors $154_1$ and $154_2$ is connected, respectively, to an input of inverters $152_1$ and $152_2$ and a second source/drain of n-channel transistors $150_1$ and $150_2$ is connected, respectively, to a first terminal of a connection $156_1$ and $156_2$. The second terminal of each connection $156_1$ and $156_2$ is connected to receive the data B and BN, respectively, from the next least significant bit (shown as N−1) relative to the bit B (and its complement) that is provided to n-channel transistors $150_1$ and $150_2$.

The operation of switched buffer $58_{B3}$ of FIG. 10 is now described. By way of introduction, note that in the preferred embodiment the normalizer provided by sub-unit $54_4$ is operable with respect to at least two instructions of interest for the present discussion. The NORM instruction looks for the leading 1 or 0 in a 32-bit signed number, while the LMBD (Left Most Bit Detect) instruction uses a second data input to specify whether to look for a 0 or 1, then looks for that over all 32 bits of the input data. The difference between these two instructions is that bit 30 is the highest bit position to find a 1 or 0 for the NORM instruction, while bit 31 is the highest bit position for the LMBD instruction. In order to combine these two alternative operations for the normalizer sub-unit $54_4$ in the preferred embodiment, the B input data is left shifted for the NORM instruction by asserting SEL_NORM and not asserting SEL_LMBD, while it is not left shifted for the LMBD instruction by asserting SEL_LMBD and not asserting SEL_NORM. Looking more particularly to these operations with respect to the schematic, when SEL_LMBD is asserted and SEL_NORM is not asserted during an evaluate phase, then the inputs to inverters $152_1$ and $152_2$ are connected via respective n-channel transistors $150_1$ and $150_2$ to B and BN, respectively. Conversely, when SEL_NORM is asserted and SEL_LMBD is not asserted during an evaluate phase, then the input to inverter $152_1$ is connected via n-channel transistor $154_1$ to connection $156_1$, thereby connecting the immediately-less significant bit value of data B to the input of inverter $152_1$, and at the same time the input to inverter $152_2$ is connected via n-channel transistor $154_2$ to connection $156_2$, thereby connecting the immediately-less significant bit value of data BN to the input of inverter $152_2$. In this manner, therefore, the above-described left shift operation of the NORM instruction is facilitated. Moreover, for either the NORM or LMBD instruction, note once more that each data signal (i.e., B and BN) is connected at most to the input of a single inverter, thereby minimizing the load on the drive signal and its driving circuitry.

Figure 11:
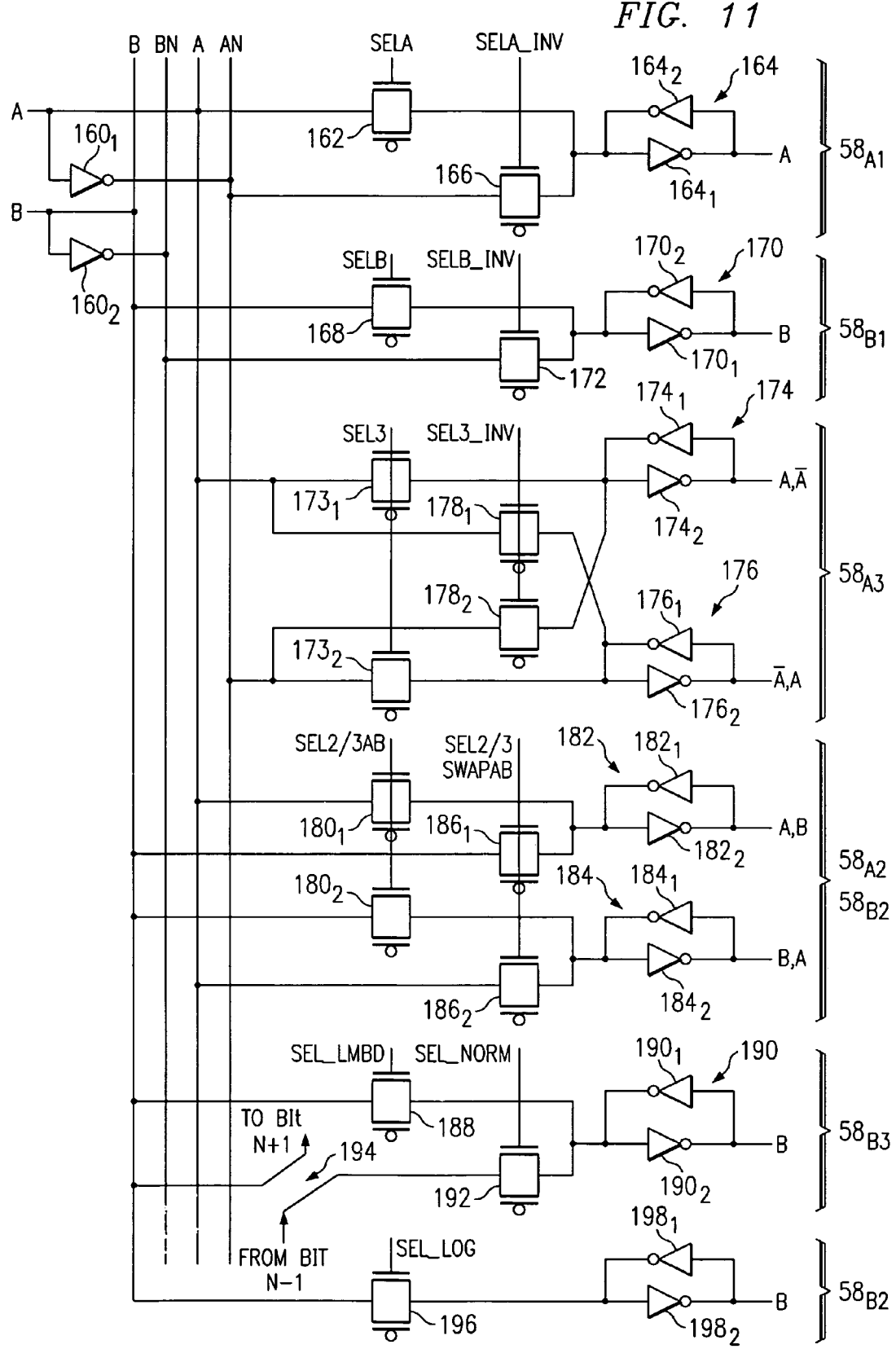
FIG. 11 illustrates a schematic of an embodiment using static logic for all of switched buffers $58_{A1}$, $58_{A2}$, $58_{A3}$, $58_{B1}$, $58_{B2}$, and $58_{B3}$ of FIG. 3.

FIG. 11 illustrates a schematic of an embodiment using static logic for all of switched buffers $58_{A1}$, $58_{A2}$, $58_{A3}$, $58_{B1}$, $58_{B2}$, and $58_{B3}$ of FIG. 3. Some of the concepts of FIG. 11 are comparable to those in FIG. 10 and, thus, the reader is assumed familiar with the earlier discussion. However, in FIG. 11, the implementation is with static logic and thus CMOS pass gates are used instead of n-channel devices and latched outputs are provided instead of precharged outputs. In addition, there are several differences over and beyond the use of these two aspects, as detailed later.

At the outset, FIG. 11 again illustrates the data A and B and the negative values thereof; however, because this is a static logic implementation, there are not necessarily dual rail signals provided by the forwarding multiplexers $56_A$ and $56_B$, if constructed in the manner such as was described earlier with respect to FIGS. 4 and 6. Thus, to provide the additional negative inputs AN and BN, an additional inverter, $160_1$ and $160_2$, respectively, is required from each of the forwarding multiplexers. In any event, given the provision of the two data states and their corresponding complements shown in FIG. 11, the connections of those signals to the various switched buffers is as described below.

Looking to switched buffer $58_{A1}$ of FIG. 11, the data A is connected to a CMOS pass gate 162 which is further connected to the input of a latch 164 having two inverters $164_1$ and $164_2$, where inverter $164_1$ provides the input and output of latch 164 and where the input of inverter $164_2$ is connected to the output of inverter $164_1$ and the output of inverter $164_2$ is connected to the input of inverter $164_1$. The n-channel transistor of pass gate 162 is controlled by a signal SELA, while the complement of this control signal controls the p-channel transistor of that same pass gate; for sake of simplifying the illustration of FIG. 11, however, this complementary control is not shown with respect to buffer $58_{A1}$ and, indeed, the complementary control signals to the other p-channel transistors of other switched buffers in FIG. 11 also are not shown, but are understood to be implemented as will be appreciated by one skilled in the art. The AN data is connected to a CMOS pass gate 166 which is further connected to the input of latch 164, and the n-channel transistor of pass gate 166 is controlled by a signal SELA_INV, while the complement of that signal controls the p-channel transistor of pass gate 166.

The operation of switched buffer $58_{A1}$ in its static logic form of FIG. 11 should be understood in part given some level of comparability to the dynamic logic buffer of FIG. 10. For a single execution cycle of sub-unit $58_{A1}$, only one of the control signals SELA and SELA_INV may be asserted. When SELA is asserted, and hence SELA_INV is not asserted, then pass gate 162 connects the data A input to the input of latch 164. Conversely, when SELA_INV is asserted, and hence SELA is not asserted, then pass gate 162 connects the AN data input to the input of latch 164. Finally, therefore, latch 164 presents as an output the complement of its data input.

Looking to switched buffer $58_{B1}$ of FIG. 11, it is constructed in the same schematic manner as switched buffer $58_{A1}$, but with different input and control signals since it relates to the data B as opposed to the data A. Thus, the data B is connected to a CMOS pass gate 168 which is further connected to the input of a latch 170 having two inverters $170_1$ and $170_2$ connected in the feedback configuration as in the case of earlier-described latches. The n-channel transistor of pass gate 168 is controlled by a signal SELB, where again the complement of this control signal is applied to the p-channel transistor in pass gate 168 but is not shown yet understood to apply. The BN data is connected to a CMOS pass gate 172 which is further connected to the input of latch 170, and the n-channel transistor of pass gate 172 is controlled by a signal SELB_INV, while the p-channel transistor of pass gate 172 is controlled by the complement of SELB_INV.

The operation of switched buffer $58_{B1}$ of FIG. 11 is the same as that of switched buffer $58_{A1}$, but as applied to the data B (and its complement BN). Thus, for a single execution cycle of sub-unit $58_1$, only one of the control signals SELB and SELB_INV may be asserted. When SELB is asserted, and hence SELB_INV is not asserted, then pass gate 168 connects the data B input to the input of latch 170. Conversely, when SELB_INV is asserted, and hence SELB is not asserted, then pass gate 172 connects the data BN input to the input of latch 170. Finally, therefore, latch 170 presents as an output the complement of its data input.

Turning to switched buffer $58_{A3}$ of FIG. 11, a single control signal SEL3 is connected to control two CMOS pass gates $173_1$ and $173_2$, by connecting that signal to the n-channel transistors of those gates and the complement of that signal to the p-channel transistors of those gates. The input of CMOS pass gate $173_1$ is connected to the data A while the input of CMOS pass gate $173_2$ is connected to the data AN. The output of CMOS pass gate $173_1$ is connected to the input of a latch 174 having two inverters $174_1$ and $174_2$ connected in the feedback configuration as earlier-described latches, and the output of CMOS pass gate $172_2$ is connected to the input of a latch 176 also having two inverters 176₁ and 176₂ connected in the feedback configuration as earlier-described latches. Also within switched buffer 58$_{A3}$, a single control signal SEL3_INV is connected to control two CMOS pass gates 178₁ and 178₂, by connecting that signal to the n-channel transistors of those gates and the complement of that signal to the p-channel transistors of those gates. The input of CMOS pass gate 178₁ is connected to the data A, and the input of CMOS pass gate 178₂ is connected to the data AN. The output of CMOS pass gate 178₁ is connected to the input of latch 176, and the output of CMOS pass gate 178₂ is connected to the input of latch 174.

The operation of switched buffer 58$_{A3}$ of FIG. 11 is such that for a single execution cycle of sub-unit 58₃, only one of the control signals SEL3 and SEL3_INV may be asserted. When SEL3 is asserted, and hence SEL3_INV is not asserted, then pass gate 173₁ connects the data A input to the input of latch 174 and pass gate 173₂ connects the data AN input to the input of latch 176, thereby presenting the first column of outputs shown in FIG. 11 (i.e., A and $\overline{A}$). Conversely, when SEL3_INV is asserted, and hence SEL3 is not asserted, then pass gate 178₁ connects the data A input to the input of latch 176 and pass gate 178₂ connects the data AN input to the input of latch 174, thereby presenting the second column of outputs shown in FIG. 11 (i.e., A and $\overline{A}$).

Turning to switched buffers 58$_{A2}$ and 58$_{B2}$ of FIG. 11, a portion of their structure and functionality is shown as shared due to shared control signals. Specifically, a single control signal SEL2/3AB is connected to control two CMOS pass gates 180₁ and 180₂, by connecting that signal to the n-channel transistors of those gates and the complement of that signal controls the p-channel transistors of those gates. The input of CMOS pass gate 180₁ is connected to the data A, and the input of CMOS pass gate 180₂ is connected to the data B. The output of CMOS pass gate 180₁ is connected to the input of a latch 182 having two inverters 182₁ and 182₂ connected in the feedback configuration as earlier-described latches, and the output of CMOS pass gate 180₂ is connected to the input of a latch 184 also having two inverters 184₁ and 184₂ connected in the feedback configuration as earlier-described latches. Also within switched buffers 58$_{A2}$ and 58$_{B2}$, a single control signal SEL2/3SWAPAB is connected to control two CMOS pass gates 186₁ and 186₂, by connecting that signal to the n-channel transistors of those gates and the complement of that signal to the p-channel transistors of those gates. The input of CMOS pass gate 186₁ is connected to the data B, and the input of CMOS pass gate 186₂ is connected to the data A. The output of CMOS pass gate 186₁ is connected to the input of latch 182, and the output of CMOS pass gate 186₂ is connected to the input of latch 184.

The operation of switched buffers 58$_{A2}$ and 58$_{B2}$ of FIG. 11 is such that for a single execution cycle of sub-unit 58₂ or 58₃, only one of the control signals SEL2/3 and SEL2/3SWAPAB may be asserted. When SEL2/3 is asserted, and hence SEL2/3SWAPAB is not asserted, then pass gate 180₁ connects the A data input to the input of latch 182 and pass gate 180₂ connects the B data input to the input of latch 184, thereby presenting the first column of outputs shown in FIG. 11 (i.e., A and B). Conversely, when SEL2/3SWAPAB is asserted, and hence SEL2/3 is not asserted, then pass gate 186₁ connects the B data input to the input of latch 182 and pass gate 186₂ connects the A data input to the input of latch 184, thereby presenting the second column of outputs shown in FIG. 11 (i.e., B and A).

Turning to switched buffer 58$_{B3}$ of FIG. 11, the B data is connected to a CMOS pass gate 188 which is further connected to the input of a latch 190 having two inverters 190₁ and 190₂ connected in the same manner as for earlier-described latches. The n-channel transistor of pass gate 188 is controlled by a signal SEL_LMBD and the complement of that signal to the p-channel transistor of that gate. Switched buffer 58$_{B3}$ also includes a second CMOS pass gate 192, having its input connected to a first terminal of a connection 194, where the second terminal of connection 194 is connected to receive the B data from the next least significant bit (shown as N–1) than the bit B that is provided to pass gate 188. The output of CMOS pass gate 192 is connected to the input of latch 190, and the output of latch 190 provides the output of buffer 58$_{B3}$.

The operation of switched buffer 58$_{B3}$ of FIG. 11 is now described, but it is assumed that the reader is familiar with the previous discussion of the FIG. 10 switched buffer 58$_{B3}$ and its operation in that the same functions with respect to the NORM and LMBD instructions are implemented in connection with the embodiment of FIG. 11. Thus, in the preferred embodiment, the input data B is left shifted for the NORM instruction by asserting SEL_NORM and not asserting SEL_LMBD, while it is not left shifted for the LMBD instruction by asserting SEL_LMBD and not asserting SEL_NORM. Looking more particularly to these operations with respect to the schematic, when SEL_LMBD is asserted and SEL_NORM is not asserted, then pass gate 188 connects the data B directly to the input of latch 190. Conversely, when SEL_NORM is asserted and SEL_LMBD is not asserted, then pass gate 192 connects the immediately-less significant bit value of data B to the input of latch 192; in this manner, therefore, the above-described left shift operation of the NORM instruction is achieved.

Finally, FIG. 11 at its bottom includes a separate circuit for providing the data B to the logical operator block of sub-unit 54₂. Thus, in addition to the provision of the data B to sub-unit 54₃ by switched buffer 58$_{B2}$ as described above, in the preferred embodiment for a static implementation a separate circuit is used to provide the data B to sub-unit 54₂, and this separate circuit is shown in FIG. 11 as 58'$_{B2}$. Circuit 58'$_{B2}$ includes a CMOS pass gate 196 having an input connected to the data B, complementary gates controlled by complementary states of a control signal SEL_LOG, and an output connected to the input of a latch 198 having two inverters 198₁ and 198₂ connected in the same manner as for earlier-described latches. The output of latch 198 provides the data B to the logical operator block of sub-unit 54₂.

Having described the static logic preferred embodiment of FIG. 11, attention is now turned to the various differences between it and the dynamic logic preferred embodiment of FIG. 10. The preferred embodiment of FIG. 11 provides single rail inputs to the sub-units instead of dual rail. Dual rail is typically not necessary for static logic although it might be used in cases where extreme speed is required. Despite the preceding, in the preferred embodiment of FIG. 11 and as further appreciated below, dual rail signals are provided by switched buffer 58$_{A3}$ because, recalling from FIG. 3, that output is connected to provide the shift count to sub-unit 54₃ as a shifter, and providing both polarities of outputs helps speed this sometimes critical path; further, since switched buffer 58$_{A3}$ provides dual rail outputs, then transistors 178₁ and 178₂ are preferably added because they provide the additional data invert functionality without increasing the series load of the data path. In addition, there is an additional path 58$_{B2}$ to provide data to sub-unit 54₂ as a logical operator block. This path provides a separate latched B output to sub-unit 54₂, allowing that unit to be powered down separately from sub-unit 54₃. For example, an additional n-channel transistor may be included in the discharge path of the first stage of each sub-unit to allow each such sub-unit to be independently powered down and, indeed, that same transistor might provide additional functionality as well. The data A input to sub-units 54₂ and 54₃ is still shared, where the A input is used by sub-unit 54₃, as a shifter, in only a limited way, and it is straightforward to de-sensitize the shifter to changes in the A input for other instructions. Since the data A input is used by the sub-unit 54₃ as a shifter in only a relatively small number of infrequently-used instructions, letting sub-unit 54₂ as a logical operator block receive any possible transition that is also input to sub-unit 54₃ during that cycle is acceptable. Alternatively, when one of those instructions occurs, the controls of logical operator block of sub-unit 54₂ can change to de-sensitize that input; this control change will create a transition at the unused sub-unit 54₂, but there would be one anyway due to the changing input and then for all future shift operations the logical operator block will transition no more until it is used in a later execution cycle. Lastly, note that it is possible to alter the selection of inputs to the sub-units due to considerations in the design of those sub-units. For example, the shifter includes not only the basic shift and extract instructions, but a number of pack and unpack instructions that are meant to move back and forth among 8, 16, and 32 bit instructions. Depending on how those are implemented, it might be advantageous to provide separate output copies of the A and B data for a separate pack/unpack sub-unit.

From the above, it may be appreciated that the above embodiments provide numerous advantages over the prior art by implementing numerous manners of improving performance and efficiency through selectively forwarding data from forwarding multiplexers to no more than half of the sub-units in the processor functional unit(s) and inmost instances to only one of those sub-units. These approaches have been illustrated using numerous examples by way of illustration and not by way of limitation. Thus, one skilled in the art may readily apply the inventive teachings of this document to numerous processors having more or less sub-units than that described herein and/or including sub-units that provide different functionality than those described by way of preferred example. Consequently, while the present embodiments have been described in detail, various substitutions, modifications or alterations could be made to the descriptions set forth above without departing from the inventive scope which is defined by the following claims.

The invention claimed is:

1. A processor operable in response to an instruction set comprising a plurality of instructions, the processor comprising:
    a functional unit comprising an integer number S of sub-units;
        wherein each of the sub-units is operable to execute during an execution cycle at least one of the instructions in the instruction set in response to at least two data arguments; and
        wherein S is greater than one;
    circuitry for providing an updated value of the at least two data arguments to less than all S of the sub-units for a single execution cycle;
        wherein the circuitry for providing an undated value comprises:
            a plurality of data inputs, each of the data inputs for receiving a respective data value;
            a plurality of output latches, wherein one of the output latches is for providing an updated value of one of the at least two data arguments for a single execution cycle;
            a first plurality of pass gates, each pass gate of the first plurality of pass gates coupled between a respective one of the first plurality of data inputs and an output node; and
            a second plurality of pass gates, each pass gate of the second plurality of pass gates coupled between the output node and an input of a respective one of the plurality of latches;
        circuitry for enabling only one pass gate of the first plurality of pass gates for a given single execution cycle; and
        circuitry for enabling only one pass gate of the second plurality of pass gates for the given single execution cycle.

2. The processor of claim 1 wherein the functional unit further comprises an additional sub-unit operable to execute during an execution cycle at least one of the instructions in the instruction set in response to only a first data argument of the at least two data arguments.

3. The processor of claim 2 wherein the additional sub-unit comprises a normalizer.

4. The processor of claim 3 wherein the circuitry for providing is further for providing an updated value of the first data argument to only the additional sub-unit for a single execution cycle.

5. The processor of claim 2 wherein the circuitry for providing is further for providing an updated value of the first data argument to only the additional sub-unit for a single execution cycle.

6. The processor of claim 2 wherein the circuitry for providing is for providing the updated value of the at least two data arguments to no more than half of the S sub-units for a single execution cycle.

7. The processor of claim 1 wherein the circuitry for providing is for providing the updated value of the at least two data arguments to only one of the S of the sub-units for a single execution cycle.

8. The processor of claim 1:
    wherein the integer number S of sub-units comprise a logical operator unit and a shifter unit; and
    wherein the circuitry for providing is for providing the updated value of the at least two data arguments to the logical operator unit and the shifter unit for a single execution cycle.

9. A processor operable in response to an instruction set comprising a plurality of instructions, the processor comprising:
    a functional unit comprising an integer number S of sub-units;
        wherein each of the sub-units is operable to execute during an execution cycle at least one of the instructions in the instruction set in response to at least two data arguments; and
        wherein S is greater than one;
    circuitry for providing an updated value of the at least two data arguments to less than all S of the sub-units for a single execution cycle;
    wherein the circuitry for providing an updated value of the at least two data arguments comprises dynamic logic circuitry for providing dual rail signals of at least one of the at least two data arguments; and wherein the dynamic logic circuitry comprises:
a first input node for receiving a first data value;
a second input node for receiving a second data value comprising a dual rail signal of the first data value;
first and second output inverters, wherein the output inverters are for providing dual rail updated values of one of the at least two data arguments for a single execution cycle;
a first transistor comprising a source/drain path coupled between the first input node and an input to the first output inverter;
a second transistor comprising a source/drain path coupled between the second input node and an input to the second output inverter; and
circuitry for enabling the first and second transistor for a given single execution cycle;
a third transistor comprising a source/drain path coupled between the first input node and the input to the second output inverter;
a fourth transistor comprising a source/drain path coupled between the second input node and the input to the first output inverter; and
circuitry for enabling the third and fourth transistor for a given single execution cycle; and
wherein for a single execution cycle only one of either the first and second or the third and fourth transistors are enabled.

10. The processor of claim 9:
wherein the integer number S of sub-units comprise an arithmetic logic unit; and
wherein the first and second output inverters are for providing dual rail updated values of the one of the at least two data arguments to the arithmetic logic unit.

11. The processor of claim 9:
wherein the integer number S of sub-units comprise a shifter unit; and
wherein the first and second output inverters are for providing dual rail updated values of the one of the at least two data arguments to the shifter unit.

12. The processor of claim 11 wherein the first and second output inverters are for providing the dual rail updated values of the one of the at least two data arguments to the shifter unit for indicating an extent of a data shift.

13. A processor operable in response to an instruction set comprising a plurality of instructions, the processor comprising:
a functional unit comprising an integer number S of sub-units;
wherein each of the sub-units is operable to execute during an execution cycle at least one of the instructions in the instruction set in response to at least two data arguments; and
wherein S is greater than one;
circuitry for providing an undated value of the at least two data arguments to less than all S of the sub-units for a single execution cycle;
wherein the functional unit further comprises an additional sub-unit operable to execute during an execution cycle at least one of the instructions in the instruction set in response to only a first data argument of the at least two data arguments;
wherein the circuitry for providing is further for providing an updated value of the first data argument to only the additional sub-unit for a single execution cycle;
wherein the circuitry for providing an updated value of the first data argument to only the additional sub-unit comprises dynamic logic circuitry for providing dual rail signals of the first data argument;
wherein the dynamic logic circuitry comprises:
a first input node for receiving a first data value;
a second input node for receiving a second data value comprising a dual rail signal of the first data value;
first and second output inverters, wherein the first and second output inverters are for providing dual rail updated values of one of the at least two data arguments for a single execution cycle;
a first transistor comprising a source/drain path coupled between the first input node and an input to the first output inverter;
a second transistor comprising a source/drain path coupled between an input to the second output inverter and a data node for presenting data representing a next least significant bit relative to the first data value;
a third transistor comprising a source/drain path coupled between the second input node and an input to the second output inverter;
a fourth transistor comprising a source/drain path coupled between an input to the second output inverter and a data node for presenting data representing a next least significant bit relative to the second data value; and
circuitry for enabling the first and third transistor for a given single execution cycle; and
circuitry for enabling the second and fourth transistor for a given single execution cycle; and
wherein for a single execution cycle only one of either the first and third or the second and fourth transistors are enabled.

14. The processor of claim 13:
wherein the integer number S of sub-units comprise a normalizer; and
wherein the first and second output inverters are for providing dual rail updated values of the first data argument to the normalizer.

15. A processor operable in response to an instruction set comprising a plurality of instructions, the processor comprising:
a functional unit comprising an integer number S of sub-units;
wherein each of the sub-units is operable to execute during an execution cycle at least one of the instructions in the instruction set in response to at least two data arguments; and
wherein S is greater than one;
circuitry for providing an updated value of the at least two data arguments to less than all S of the sub-units for a single execution cycle;
wherein the circuitry for providing an updated value of the at least two data arguments comprises:
a first input node for receiving a first data value;
a second input node for receiving a second data value comprising a logical inverse of the first data value;
an output latch, wherein the output latch is for providing an updated value for one of the at least two data arguments;
a first pass gate coupled between the first input node and an input to the latch;
a second pass gate coupled between the second input node and the input to the latch; and
circuitry for enabling, for a single execution cycle, only one of the first and second pass gates.

16. The processor of claim 15:

wherein the integer number S of sub-units comprise an arithmetic logic unit; and wherein the output latch is for providing the updated value to the arithmetic logic unit.

17. The processor of claim 15:

wherein the functional unit further comprises an additional sub-unit operable to execute during an execution cycle at least one of the instructions in the instruction set in response to only a first data argument of the at least two data arguments;

wherein the circuitry for providing is further for providing an updated value of the first data argument to only the additional sub-unit for a single execution cycle.

18. The processor of claim 17:

wherein the integer number S of sub-units comprise a normalizer; and wherein the circuitry for providing is for providing the updated value of the first data argument to the normalizer for a single execution cycle.

19. The processor of claim 15 wherein the functional unit comprises a first functional unit, and further comprising a second functional unit comprising S sub-units, wherein each of the sub-units of the second functional unit is operable to execute during an execution cycle at least one of the instructions in the instruction set in response to at least two data arguments.

20. The processor of claim 15 wherein the sub-units comprise a logical operator unit, a shifter unit, an arithmetic logic unit, and a normalizer unit.

21. The processor of claim 15 wherein the functional unit comprises a functional unit in a digital signal processor.

22. The processor of claim 15 wherein the functional unit comprises a functional unit in a microprocessor.

* * * * *